(12) United States Patent
Hamada et al.

(10) Patent No.: US 8,456,590 B2
(45) Date of Patent: Jun. 4, 2013

(54) OPTICAL SHEET, SURFACE LIGHT SOURCE AND DISPLAY DEVICE

(75) Inventors: Satoru Hamada, Tokyo (JP); Hiroshi Yamamoto, Tokyo (JP); Junichi Sawanobori, Yamanashi (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 755 days.

(21) Appl. No.: 12/521,421

(22) PCT Filed: Dec. 28, 2007

(86) PCT No.: PCT/JP2007/075299
§ 371 (c)(1),
(2), (4) Date: Feb. 16, 2010

(87) PCT Pub. No.: WO2008/084744
PCT Pub. Date: Jul. 17, 2008

(65) Prior Publication Data
US 2010/0271840 A1     Oct. 28, 2010

(30) Foreign Application Priority Data
Jan. 9, 2007 (JP) ................................. 2007-000961

(51) Int. Cl.
*G02F 1/1335* (2006.01)
(52) U.S. Cl.
USPC ........................ 349/64; 349/112; 428/315.5
(58) Field of Classification Search
USPC .................. 349/64, 112; 428/315.5
See application file for complete search history.

(56) References Cited

U.S. PATENT DOCUMENTS

| 4,576,850 | A | | 3/1986 | Martens |
| 5,976,686 | A | * | 11/1999 | Kaytor et al. ............... 428/317.9 |
| 6,057,961 | A | * | 5/2000 | Allen et al. ............... 359/489.12 |
| 6,111,696 | A | * | 8/2000 | Allen et al. ............... 359/487.02 |
| 6,177,153 | B1 | | 1/2001 | Uchiyama et al. |
| 6,497,946 | B1 | * | 12/2002 | Kretman et al. ........... 428/317.9 |
| 6,890,642 | B2 | * | 5/2005 | Kaminsky et al. ......... 428/319.3 |
| 6,917,396 | B2 | * | 7/2005 | Hiraishi et al. ................. 349/64 |
| 7,092,163 | B2 | * | 8/2006 | Bastawros et al. ............ 359/599 |

(Continued)

FOREIGN PATENT DOCUMENTS

| JP | S56-157310 | 12/1981 |
| JP | S61-156273 | 7/1986 |

(Continued)

OTHER PUBLICATIONS

International Search Report mailed on Mar. 25, 2008 for the corresponding International patent application No. PCT/JP2007/075299 (English translation enclosed).

*Primary Examiner* — Mary Ellen Bowman
(74) *Attorney, Agent, or Firm* — Posz Law Group, PLC

(57) ABSTRACT

An optical sheet is structured to have a translucent substrate 12, an optical element 16 provided on one surface S1 of the translucent substrate 12, on which a plurality of unit prisms 14 or unit lenses are arranged, and a light diffusion layer provided between the one surface S1 and the optical element 16 and/or on another surface S2 of the translucent substrate 12, and at least one of the light diffusion layer 18 includes gap parts 22 as a light diffusion element. At this time, the gap parts 22 is preferably in an approximately oval shape oriented in a uniaxial direction in plan view.

19 Claims, 22 Drawing Sheets

U.S. PATENT DOCUMENTS

| | | |
|---|---|---|
| 2003/0156238 A1* | 8/2003 | Hiraishi et al. ............... 349/112 |
| 2003/0170442 A1* | 9/2003 | Kaminsky et al. ......... 428/315.5 |
| 2003/0214812 A1 | 11/2003 | Bourdelais et al. |
| 2005/0053729 A1* | 3/2005 | Bourdelais et al. ............ 428/1.1 |

FOREIGN PATENT DOCUMENTS

| | | |
|---|---|---|
| JP | H3-223883 | 10/1991 |
| JP | H5-169015 | 7/1993 |
| JP | H07-151909 A | 6/1995 |
| JP | H10-300908 A | 11/1998 |
| JP | H11-133214 A | 5/1999 |
| JP | 2001-004813 A | 1/2001 |
| JP | 2001-124909 A | 5/2001 |
| JP | 2002-098810 A | 4/2002 |
| JP | 2004-012681 A | 1/2004 |
| JP | 2004-038146 A | 2/2004 |
| JP | 2004-103335 A | 4/2004 |
| JP | 2004-163872 A | 6/2004 |
| JP | 2004-271568 A | 9/2004 |
| JP | 2005-181648 A | 7/2005 |
| JP | 2006-100182 A | 4/2006 |
| WO | WO 98/05984 A1 | 2/1998 |

* cited by examiner (A)

(B)

FULL REFLECTION AT α=51.3° OR MORE

FULL REFLECTION AT α =90° OR MORE (A)

(B)

OPTICAL SHEET, SURFACE LIGHT SOURCE AND DISPLAY DEVICE

TECHNICAL FIELD

This invention relates to an optical sheet, a surface light source device and a display device. In particular, this invention relates to an optical sheet appropriately used in a surface light source device for a backlight that illuminates a translucent display body, such as a liquid crystal display device or an advertisement billboard, from a rear side thereof, a surface light source device having such an optical sheet, and a display device having such a surface display device.

BACKGROUND

With the need for reduced power consumption, a thinner width and lighter weight for recent liquid crystal display devices, surface light source devices for illuminating the liquid crystal display device from the rear side are also required to be thinner and lighter. In order to meet these needs, power consumption by the light source is reduced by more effectively using the light from the light sources. An edge-light type surface light source device and a direct-light type light source device are known as the surface light source devices used in such liquid crystal displays.

In the edge-light type surface light source device, in general, light from the light source enters from a side end surface of a plate-shaped light guide body made of a transparent acrylic resin or the like, and exits from a light exiting surface, which is another surface of the light guide body, to the rear side of the liquid crystal panel and the like. In this surface light source device, the light usage efficiency is increased by providing a light reflection plate or a light reflection film on a surface of the light guide body that is opposite from the light exiting surface. In addition, the exiting light is made uniform by providing a light diffusion sheet on the side of the light exiting surface of the light guide body. On the other hand, in the direct-light type surface light source device, a liquid crystal panel and a reflection plate are arranged across the light source provided therebetween. The exiting light is normally made uniform by reflecting the light from the light source by the reflection plate to the backside of the liquid crystal panel and diffusing the light by a light diffusion sheet positioned on the light entrance side of the liquid crystal panel.

In such edge-light type or direct-light type surface light source device, an optical sheet, on which a plurality of unit prisms is arranged, is positioned on the light exiting surface of the light guide body. The optical sheet refracts and transmits the light from the surface light source on the side of the display body, such as a liquid crystal panel. However, such an optical sheet generates nonuniformity of brightness, such as uneven brightness by equal thickness fringes and visible images of the light source, or repeated markings of bright and dark areas, caused by the light from the surface light source device. The liquid crystal display device equipped with such an optical sheet encounters a problem that the images easily become distorted by the nonuniformity of the brightness.

To solve such a problem, Patent Reference 1 below proposes an optical sheet having fine grooves on a smooth surface opposite from the surface on which a plurality of unit prisms are provided. With this optical sheet, however, there is a problem that the primary function of the optical sheet, which is, increasing the brightness of the light by collecting the light from the surface light source device in a direction normal to the light exiting surface, is decreased. Patent References 2 and 3 below propose an optical sheet, a surface light source device and a transmissive type display device that controls the generation of the fringes without decreasing the brightness on the light exiting surface side. Such an optical sheet is arranged with a plurality of unit prisms on the surface of a translucent base and covers the rear side of the translucent substrate by a coating layer made of a translucent material. In Patent Reference 2, a large number of fine bumps are provided on the surface of the coating layer opposite from the translucent base. In addition, Patent Reference 3 provides fine protrusions by including spherical beads in the coating layer. In both cases, nonuniformity of brightness that is caused by generation of fringes is suppressed.

[Patent Reference 1] Japanese laid-open application number H07-151909
[Patent Reference 2] Japanese laid-open application number H10-300908
[Patent Reference 3] Japanese laid-open application number H11-133214

DISCLOSURE OF THE INVENTION

Problem Solved by the Invention

However, with the recent increase in competition for development of high quality liquid crystal display devices, the problem of suppressing the nonuniformity of brightness due to the generated fringes and the like by increasing the degree of "defocus" without decreasing the brightness has not been sufficiently addressed even with the optical sheets of Patent References 2 and 3. Therefore, further improvement is required.

This invention solves the above-discussed problems. An object of the invention is to provide an optical sheet that can suppress the nonuniformity of brightness caused by generation of fringes or the like by improving the degree of "defocus" while controlling the decrease in brightness to a minimum level. In addition, another object of this invention is to provide a surface light source device having such an optical sheet and a display device equipped with the surface light source.

Means for Solving the Problem

An optical sheet according to this invention for solving the above-discussed problems has a translucent substrate, an optical element provided on one surface of the translucent substrate, on which a plurality of unit prisms or unit lenses is arranged, and a light diffusion layer provided between the one surface and the optical element and/or on another surface of the translucent substrate. A light diffusion layer of the light diffusion layers provided on at least one of the surfaces includes gap parts as a light diffusion element.

According to this invention, because at least one of the light diffusion layers provided between a surface of the translucent substrate and the optical element and the light diffusion layer provided on another surface of the translucent substrate has gap parts as a light diffusion element, the light that enters into the light diffusion layer is refracted or reflected on a surface of the gap parts that functions as the light diffusion element. Because the refractivity of the gap parts is substantially one, the light is effectively diffused by the refraction or reflection on the boundary surface of the gap parts. As a result, the level of defocus can be increased as a whole, thereby suppressing "nonuniformity of brightness," uneven brightness due to equal thickness fringes and a visible light source image, and repeated markings of bright and dark areas, which are caused by the light from a surface light source device.

In addition, the optical sheet according to this invention may be structured to have a translucent substrate in which gap parts, as a light diffusion element, are formed near one surface or within an area between one surface and another surface of the translucent substrate, and an optical element that is configured with a plurality of unit prisms or unit lenses provided on the one surface of the translucent substrate.

As a preferred embodiment of the optical sheet according to this invention, the optical sheet is structured such that the light diffusion layer having the gap parts is formed by uniaxially or biaxially stretching a transparent resin layer in which micro particles are dispersed, and that the gap parts are in a flat shape in cross sectional view that extends in a direction orthogonal to a normal line of the optical sheet.

According to this invention, the gap parts are in a flat shape in cross sectional view that extends in the direction orthogonal to the normal line of the optical sheet. Such a shape can be obtained by uniaxially or biaxially stretching a transparent resin layer in which micro particles are dispersed. Moreover, because the gap parts are in a squeezed flat shape that extends in the direction orthogonal to the normal line of the optical sheet, ends of the gap parts have a smaller radius of curvature (R) compared to a spherical shape that is not squeezed, for example. At the boundary surface of such ends, the light that enters into the light diffusion layer can be significantly diffused, resulting an optical sheet with high diffusion.

In addition, when the micro particles are translucent particles, the gap parts formed in periphery of the micro particles are formed by transparent air. Therefore, the light that enters into the light diffusion layer is transmitted without being absorbed by the micro particles and the gap parts formed in the periphery thereof. As a result, the light can be transmitted to the optical element side without attenuating the light incident to the optical sheet, and the light is deflected to the viewer's side by the optical element. Therefore, a decrease in the brightness can be suppressed to a minimum level.

As a preferred embodiment of the optical sheet of this invention, the gap parts may be structured to be approximately oval in shape that is oriented in a uniaxial direction in plan view or to be approximately circular in shape in plan view.

According to this invention, when the diffusion of light can be increased at the gap parts (especially, ends of the gap parts) of either form as discussed above, an optical sheet with high diffusion can be formed.

As a preferred embodiment of the optical sheet according to this invention, the optical sheet is structured such that, when irradiating linear light to the optical sheet, from which the optical element is removed, in parallel with a normal line of the optical sheet to measure diffusion of the linear light transmitted through the optical sheet, diffusion of light measured on a plurality of virtual lines orthogonal to the optical sheet is anisotropic.

According to this invention, because the diffusion of light measured on the plurality of virtual lines orthogonal to the normal line of the optical sheet is anisotropic, the problem of conventional nonuniformity of brightness can be solved by utilizing the anisotropic diffusion characteristics when combining the optical sheet with any light source.

In another embodiment, when representing diffusion of light for the anisotropic optical sheet by a light diffusion curve represented by brightness and a diffusion angle, a direction in which the virtual lines indicating the maximum of half bandwidths obtained from the light diffusion curve extends, is a direction orthogonal to a major axis direction of the gap parts formed in an approximate circular shape oriented in the uniaxial direction in plan view.

According to this invention, the direction in which the virtual lines indicating the maximum of half bandwidths obtained from the light diffusion curve extends (i.e., in the direction where the diffusion characteristics are maximum/maximized), is a direction orthogonal to a major axis direction of the gap parts formed in an approximate circular shape oriented in the uniaxial direction in plan view. Such matching or approximate matching of the directions originates in the shape of the gap parts in an approximately oval shape. In detail, an end of the approximately oval gap parts with a smaller curvature radius realizes higher diffusion. A percentage of the end is higher in a direction orthogonal to the major axis direction of the approximately oval gap parts oriented in the uniaxial direction, than the direction parallel with the major axis direction.

Moreover, in another embodiment, the optical sheet is preferably structured, such that when representing diffusion of light for the anisotropic optical sheet by a light diffusion curve represented by brightness and a diffusion angle, a direction in which the virtual lines indicating the maximum of half bandwidths obtained from the light diffusion curve extends, and a direction of a ridge line of the unit prisms or unit lenses structuring the optical element are crossed orthogonal or approximately orthogonal to each other.

When structuring a direct-light type backlight unit with a plurality of cold-cathode tubes or the like positioned on the rear surface of the optical sheet, normally the longitudinal direction of the cold-cathode tubes or the like and the direction of the ridge line of the unit prisms or unit lenses that the optical element is equipped with are positioned in parallel or approximately in parallel with each other. According to this invention, in the direction where the diffusion characteristics are a maximum (i.e., the direction in which the virtual lines indicating the maximum half bandwidths extends) and the direction of the ridge line are structured to be orthogonal or approximately orthogonal to each other. Therefore, generation of areas of striped uneven brightness originated from the direct-light type backlight unit can be prevented. Further, in this embodiment, the direction of a ridge line of the unit prisms or unit lenses and the major axis direction of the approximately oval gap parts oriented in the uniaxial direction are in parallel or approximately in parallel with each other.

Furthermore, in another embodiment, the optical sheet is preferably structured such that, when representing diffusion of light for the anisotropic optical sheet by a light diffusion curve represented by brightness and a diffusion angle, a direction in which the virtual lines indicating the maximum of half bandwidths obtained from the light diffusion curve extends, and a direction of a ridge line of the unit prisms or unit lenses structuring the optical element is in parallel or approximately parallel with each other.

Unlike the above embodiment, when structuring an edge-light type backlight unit provided with a light guide body positioned on a rear surface of the optical sheet and a linear light source on a side surface of the light guide body, normally the longitudinal direction of the linear light source and the direction of the ridge line of the unit prisms or unit lenses that the optical element is equipped with are positioned in parallel or approximately in parallel with each other. According to this invention, in the direction in which the diffusion characteristics are a maximum (i.e., the direction in which the virtual lines indicating the maximum half bandwidths extends) and the direction of a ridge line are structured to be parallel or approximately parallel with each other. Therefore, generation of uneven brightness in the width direction of the linear light source originated from the edge-light type backlight unit can be prevented. Further, in this embodiment, the direction of a ridge line of the unit prisms or unit lenses and the major axis direction of the approximately oval gap parts arranged in the uniaxial direction are orthogonal or approximately orthogonal to each other.

As another preferred embodiment of the optical sheet of this invention, the optical sheet is structured such that, when irradiating linear light to an optical sheet, from which the optical element is removed, in parallel with a normal line of the optical sheet to measure diffusion of the linear light transmitted through the optical sheet, diffusion of light measured on a plurality of virtual lines orthogonal to the optical sheet is isotropic.

According to this invention, because the diffusion of light measured on a plurality of virtual lines orthogonal to the optical sheet is isotropic, the conventional problem of nonuniformity of brightness can be resolved by utilizing the isotropic diffusion characteristics when combining the optical sheet with any light source.

In the optical sheet of this invention, an image contrast value of the optical sheet, from which the optical element is removed, that is measured by a method standardized by JIS K 7374 is preferably equal to or less than 15 at a slit pitch of 0.5 mm, and a Hayes value of the optical sheet that is measured by a method standardized by JIS K 7361-1 is preferably equal to or greater than 20% and equal to or less than 95%.

According to this invention, because the optical sheet has the light diffusion layer having the gap parts as the light diffusion element, the image contrast value of the optical sheet, from which the optical element is removed (i.e., the optical sheet in which a light diffusion layer having the gap parts is formed on a translucent substrate), is structured to be equal to or less than 15 at a slit pitch of 0.5 mm, and the Hayes value of the optical sheet, from which the optical element is removed, is preferably equal to or greater than 20% and equal to or less than 95%. Such an optical sheet can suppress the nonuniformity of brightness under a condition in which the loss of brightness is controlled to a minimum level.

A surface light source device according to the first embodiment of this invention for resolving the above-discussed problem has a light guide body formed of a translucent material and for discharging, from a light discharge surface that is one of the surfaces of the light guide body, light introduced from at least one side surface of the light guide body, a light source that illuminates light from the at least one side surface of the light guide body, to the inside of the light guide body, and an optical sheet that transmits the light exiting from the light discharge surface. The optical sheet has a translucent substrate, an optical element provided on one surface of the translucent substrate, on which a plurality of unit prisms or unit lenses is arranged, and a light diffusion layer provided between the one surface and the optical element and/or on another surface of the translucent substrate. A light diffusion layer of the light diffusion layers provided on at least one of the surfaces includes gap parts as a light diffusion element.

The surface light source device according to the second embodiment of this invention for resolving the above-discussed problems has an optical sheet having a translucent substrate, an optical element provided on one surface of the translucent substrate, on which a plurality of unit prisms or unit lenses are arranged, and a light diffusion layer provided between the one surface and the optical element and/or on another surface of the translucent substrate. A light diffusion layer of the light diffusion layers provided on at least one of the surfaces includes gap parts as a light diffusion element, a light source that illuminates light from a rear side of the optical sheet, and a reflection body positioned on a side opposite from the optical sheet of the light source and reflecting the light from the light source in a direction of the optical sheet.

According to the invention of the first and second embodiments, because a light diffusion layer having the gap parts as the light diffusion element is provided between the one surface of the translucent substrate structuring the optical sheet and the optical element and/or on another surface of the translucent substrate, the light from the light source enters to the optical sheet from a light discharge surface of the light guide body and refracts or reflects on the boundary surface of the gap parts in the light diffusion layer. Because the refractive index of the gap parts is substantially one, the light refracted or reflected on the boundary surface of the gap parts is effectively diffused, thereby suppressing the nonuniformity of the brightness so that the level of "defocus" improves as a whole.

Further, when utilizing micro particles for formation of the gap parts included in the light diffusion layer, when the micro particles are translucent particles, the light that enters the light diffusion layer is transmitted without being absorbed by the micro particles. Therefore, the light incident to the optical sheet can be transmitted to the optical element side without attenuation. As a result, the transmitted light is deflected to the viewer side by the optical element, thereby suppressing the decrease in brightness to a minimum level.

In the surface light source device according to the first and second embodiments, the optical element structuring the optical sheet may be structured to be provided on a side of the optical sheet from which the light from the light source exits or may be structured to be provided on a side of the optical sheet from which the light from the light source enters.

The surface light source device according to this invention may be structured such that, instead of the optical sheet according to the first and second embodiments, an optical sheet having a translucent substrate in which gap parts, as a light diffusion element, are formed near one of the surfaces or within an area between one surface and another surface of the translucent substrate, and an optical element provided on the one surface of the translucent substrate, on which a plurality of unit prisms or unit lenses are arranged, is used.

The display device according to this invention for resolving the above-discussed problem includes a flat shaped translucent display body, and the surface light source device according to this invention that is positioned on a rear side of the translucent display body and irradiates light from a rear side of the translucent display body.

According to this invention, because the surface light source device of this invention is used as a light source for the display device, the nonuniformity of brightness distribution on the display surface, which originates in the visible light source image or interference fringes, visible uneven light from the light source and the light guide body, or the like, can be suppressed. In addition, highly bright illumination light with high uniformity can be supplied to the display panel side. As a result, a display device that improves the level of image quality without decreasing brightness, in particular, a modern high-quality liquid crystal display device, can be realized.

Effect of the Invention

According to the optical sheet of this invention, with the existence of the gap parts of the light diffusion layer, which functions as a light diffusion element, diffusion of light is effectively generated. Therefore, the degree of "defocus" by the optical sheet is improved over the entire area of the optical sheet, and the "nonuniformity of brightness," such as the equal thickness fringes, observable uneven brightness of light source images, or repeated markings of bright and dark areas, caused by the light from the surface light source device, can be suppressed.

The surface light source device of this invention includes the optical sheet with the above-described effects. Therefore, the surface light source of this invention is particularly preferable as a surface light source device for modern high-quality liquid crystal display devices. Accordingly, a surface light source device that suppresses the above-discussed nonuniformity of brightness without decreasing the brightness can be provided.

The display device of this invention has the surface light source with the above-described effects. Therefore, the nonuniformity of brightness distribution on the surface that is caused by the light source image or interference fringes being observed/visible, or observable uneven light from the light source or the light guide body, can be suppressed. In addition, high brightness illumination light with high uniformity can be provided to the display panel side. Thus, a display device with an improved level of image quality, in particular, a liquid crystal display device with modern high quality, can be achieved without decreasing display brightness.

DETAILED DESCRIPTION

Embodiments of the optical sheet, surface light source device and display device according to this invention are described in detail below with reference to the figures. However, this invention is not limited to the below descriptions and figures, and can be embodied with various modifications without departing from the scope or the gist of the invention.

Figure 1:
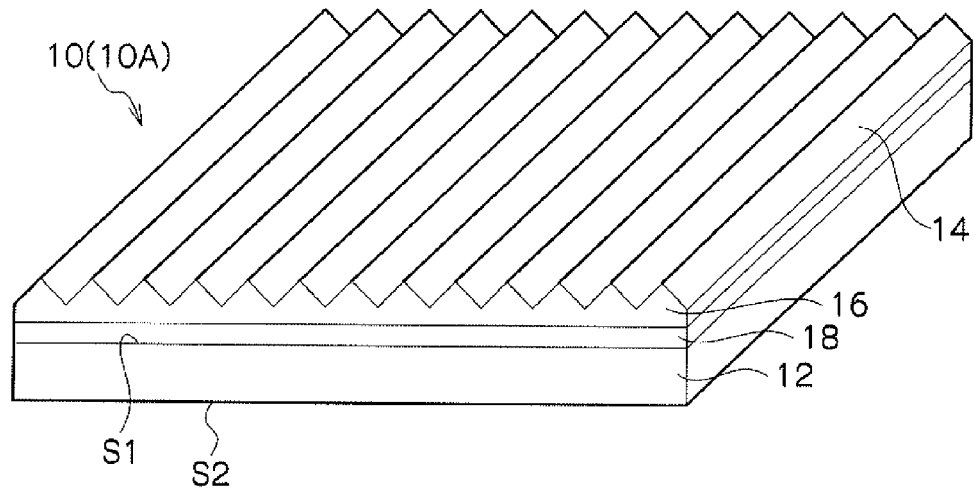
FIG. 1 is a schematic perspective view illustrating an example of the optical sheet according to this invention.
Figure 2:
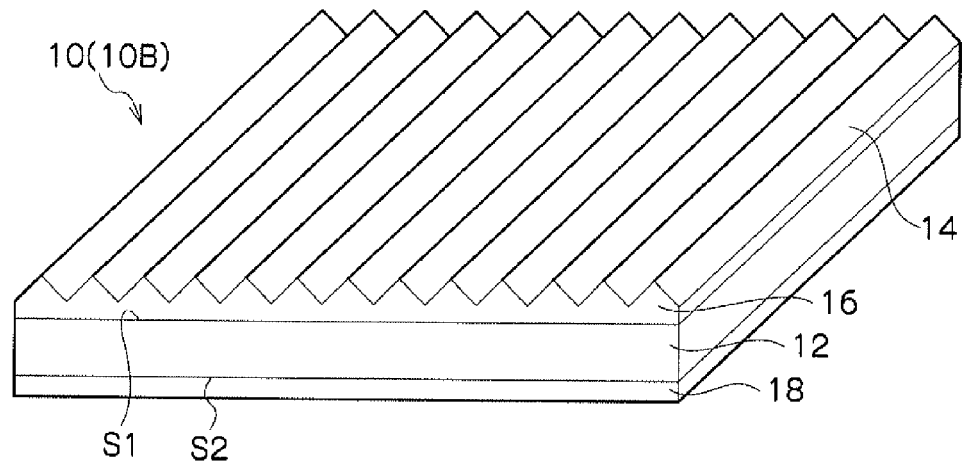
FIG. 2 is a schematic perspective view illustrating another example of the optical sheet according to this invention.
Figure 3:
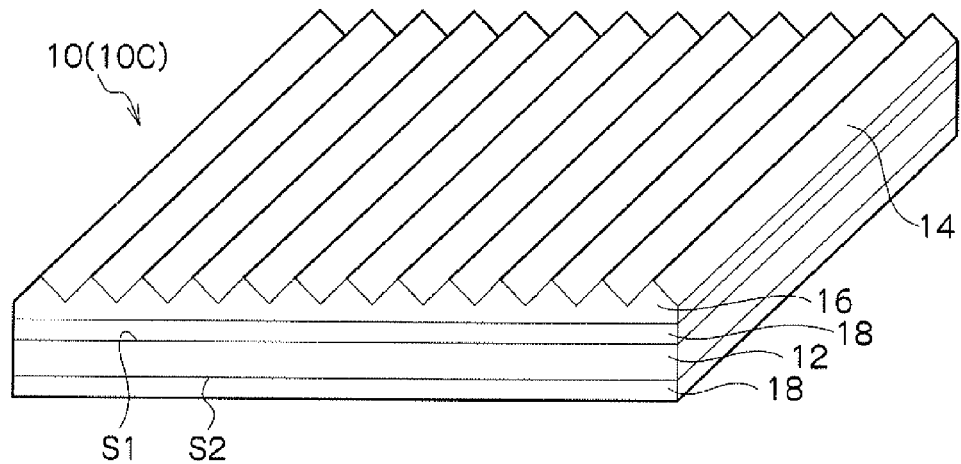
FIG. 3 is a schematic perspective view illustrating another example of the optical sheet according to this invention.

[Optical Sheet] The optical sheet is explained first. FIGS. 1 to 3 are schematic perspective views of examples of the optical sheet according to this invention. As shown in FIGS. 1 to 3, an optical sheet 10 (10A, 10B, 10C) of this invention includes a translucent substrate 12, an optical element 16 provided on a surface 51, which is one of the surfaces of the translucent substrate 12, and having a plurality of unit prisms 14 or unit lenses (see 16A and 16B shown in FIGS. 12A and 12B) arranged thereon, and a light diffusion layer 18 provided between the surface S1 and the optical element 16 and/or on a surface S2 that is the other surface of the translucent substrate 12. One light diffusion layer 18 among the light diffusion layers 18 provided on one of the surfaces (S1 or S2) has a large number of gap parts 22 as the light diffusion element. The structure of the optical sheet 10 according to this invention is explained in detail below.

(Translucent substrate) The translucent substrate 12 is the main structure of the optical sheet 10, and functions as a base for the later-discussed optical element 16 and transmits a large amount of the light from the light source to the optical element 16 side. The translucent substrate 12 may be a light transmissive substrate formed of a material, such as resin, glass or ceramic. Especially, a substrate having a transmissivity of 85% or greater by itself is preferably used. The transmissivity discussed here is a value measured by, for example, a light beam transmissometer (model: HM-150) manufactured by Murakami Color Research Laboratory Co., Ltd. The thickness of the translucent substrate 12 is not particularly limited but normally falls in a range of 50 µm to 500 µm.

For the translucent substrate 12 formed of a resin material, a transparent substrate may be preferably used that is structured from a thermoplastic resin (for example, polyester resins (such as polyethylene terephthalate, polybutylene terephthalate, and polyethylene naphthalate), acrylic resins (such as polymethyl methacrylate), a polycarbonate resin, a polystyrene resin, and polymethylpentene resin), and a resin obtained by hardening an ionization radiation hardening resin formed of oligomer (such as polyester acrylate, urethane acrylate, and epoxy acrylate), and/or acrylate series monomer by electromagnetic radiation (such as ultraviolet radiation and an electron beam). For the translucent substrate 12 formed of glass, soda glass and borosilicate glass may be used.

The translucent substrate 12 may be produced by coextruding with the later-discussed light diffusion layer 18 or may be produced by another method. The translucent substrate 12 produced by the coextrusion or another method is stretched with the light diffusion layer 18 provided thereon. The stretching process may be biaxial stretching or uniaxial stretching. By stretching the translucent substrate 12 with the light diffusion layer 18, the gap parts 22 that are the characteristic structure of this invention can be formed. The details are to be discussed below.

Figure 4:
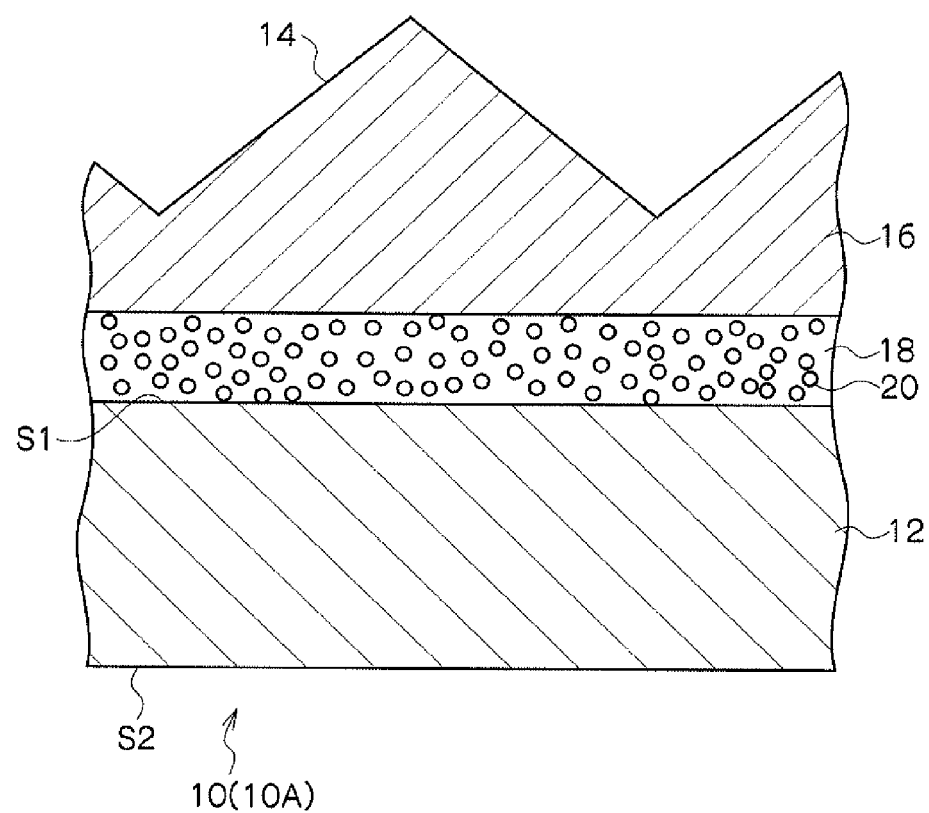
FIG. 4 is an enlarged cross-sectional view of the optical sheet shown in FIG. 1.
Figure 5:
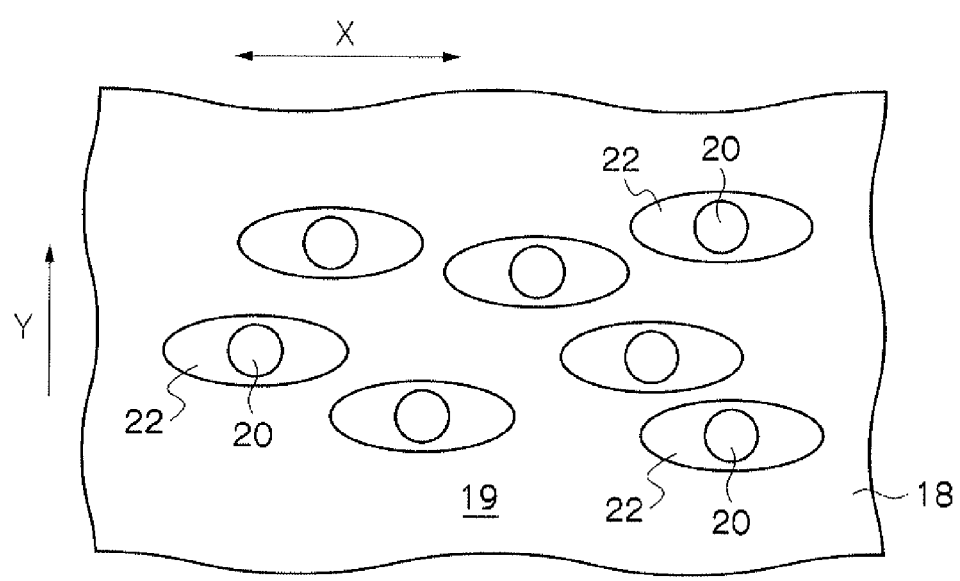
FIG. 5 is an enlarged cross-sectional view of a light diffusion layer.
Figure 6:
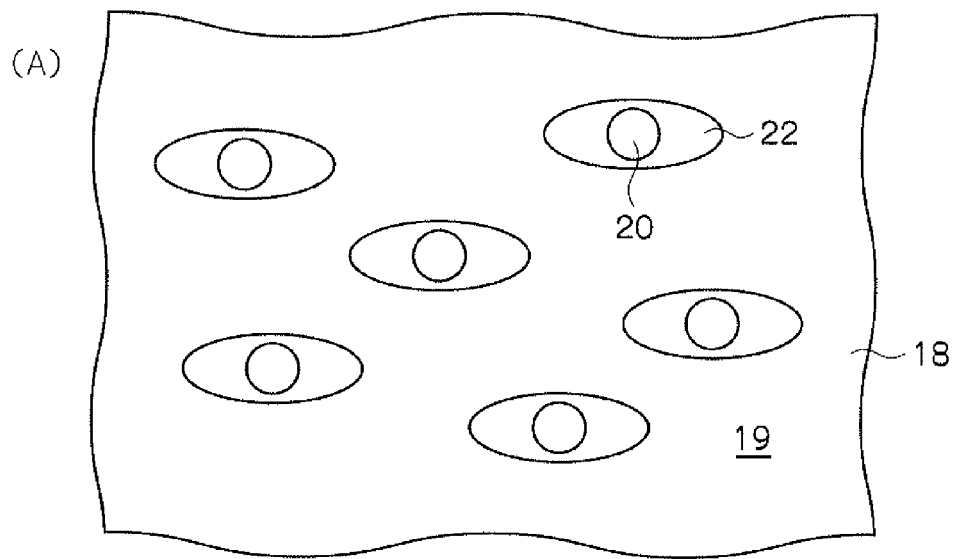
FIGS. 6A and 6B are an enlarged plan view of the light diffusion layer.
Figure 6:
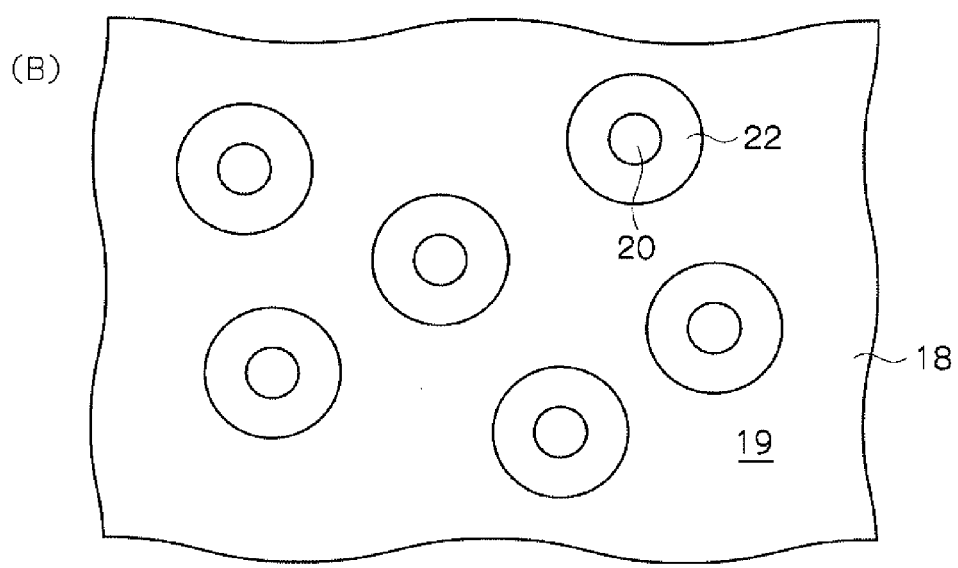

(Light diffusion layer) FIG. 4 is an enlarged cross-sectional view of the optical sheet shown in FIG. 1. In addition, FIG. 5 is an enlarged cross-sectional view of the light diffusion layer, and FIGS. 6A and 6B are an enlarged plan view of the light diffusion layer. The light diffusion layer 18 is a characteristic structure of this invention and is a layer that has a large number of the gap parts 22 as the light diffusion element as shown in FIGS. 5, 6A and 6B. Such a light diffusion layer 18 may be provided between the surface S1 of the translucent substrate 12 and the optical element 16 similar to the optical sheet 10A shown in FIG. 1, or on the other surface S2 of the translucent substrate 12 similar to the optical sheet 10B shown in FIG. 2. Alternatively, the light diffusion layer 18 may be provided both between the surface S1 of the translucent substrate 12 and the optical element 16, and on the other surface S2 of the translucent substrate 12, similar to the optical sheet 10C shown in FIG. 3. FIG. 6A shows an example of the gap parts 22 provided in the light diffusion layer 18 that has an approximately oval shape in plan view. FIG. 6B shows an example of the gap parts 22 provided in the light diffusion layer 18 that has an approximately circular shape in plan view.

A resin material 19 structuring the light diffusion layer 18 may preferably be of transparent resin materials similar to the above-discussed materials for the translucent substrate 12. Specifically, examples of the materials are thermoplastic resins including polyester resins (such as polyethylene terephthalate, polybutylene terephthalate, polyethylene naphthalate, ethylene-terephthalate-isophthalate copolymer, and ethylene glyco-1,4-cyclohexanedimethanol-terephthalic acid copolymer), acrylic resins (such as polymethyl (meth) acrylate, polybutyl (meth)acrylate, methyl (meth)acrylate-butyl (meth)acrylate copolymer, and methyl (meth)acrylate-butyl (meth)acrylate-styrene copolymer, here, "(meth) acrylate" means acrylate or methacrylate), polycarbonate resins, polystyrene resins, polymethylpentene resins, and thermoplastic urethane resins and so on. Further, examples of the materials are resins obtained by hardening ionization radiation hardening resins formed of oligomers, such as polyester (meth)acrylate, urethane (meth)acrylate, and epoxy (meth)acrylate, and/or (meth)acrylate series monomer, such as trimethylolpropane tri(meth)acrylate, and di-pentaerythritol hexa(meth)acrylate by electromagnetic radiation (such as ultraviolet radiation and electron beam). In particular, a use of a resin material that is coextrudable with the above-discussed translucent substrate 12 realizes advantages for production. The refractive index of the resin material 19 structuring the light diffusion layer 18 is normally approximately 1.45 to 1.60.

The light diffusion layer 18 shown in FIG. 5 and FIGS. 6A and 6B is structured to include the gap parts 22 around micro particles 20 in the above resin material 19. The light diffusion layer 18 of such structure can be formed by uniaxially or biaxially stretching the transparent resin on which the micro particles 20 are dispersed after the transparent material is coextruded with the resin material forming the translucent substrate 12 or after the transparent material is applied onto the translucent substrate 12. The formation degree of a large number of the gap parts 22 can be represented by a density of the gap parts 22 in a unit area when seen in plan view. In view of the result of the below-described embodiments, 10 to 3,000 gap parts per 1 $cm^2$ in plan view, for example, is preferable.

When forming the large number of the gap parts 22 using the stretching process, the micro particles 20 are composed such that the micro particles 20 substantially uniformly exist in the resin material structuring the light diffusion layer 18. The micro particles 20 may be light transmissive fine particles generally used in the optical sheets. For example, the micro particles 20 may be formed of organic fine particles (such as styrene resin particles, silicon resin particles, acrylic resin particles, and MS resin (methacry-styrene copolymer resin) particles), or non-organic fine particles (such as glass particles and glass beads). One or two or more than two types of these fine particles may be included in the resin.

It is preferable that the refractive index of these micro particles 20 is the same or less than the refractive index of the resin material 19 structuring the light diffusion layer 18. The refractive index can be set to any value based on selection of the material for the micro particles 20. By forming the light diffusion layer 18 with micro particles 20 having a refractive index that is the same or less than the refractive index of the resin material 19 structuring the light diffusion layer 18, the light can be effectively diffused when the light that enters the light diffusion layer 18 is transmitted through the micro particles 20. The refractive index of the micro particles 20 can be approximately 1.45 to 1.60, which are similar to those for the resin material 19 structuring the light diffusion layer 18, or less.

The shape of the micro particles 20 is not particularly limited. In general, an approximately spherical shape, such as a spherical shape, a spheroid shape, and a polyhedron having rounded corners, is advantageous as these shapes are easy to obtain. Micro particles 20 with an average particle diameter of 3 μm to 20 μm can more preferably be used. The average particle diameter may be determined by the cross section of the optical diffusion layer 18 as observed by a microscope and is a representation of an average value of more than 50 samples for measurement.

In this invention, the surface of the micro particles 20 is preferably processed such that the surface does not dissolve to the resin material structuring the light diffusion layer 18. It is considered that, by conducting the above process on the surface of the micro particles 20, peeling occurs at a boundary surface between a micro particle 20 and the resin material structuring the light diffusion layer 18 as a result of the stretching process after the coextrusion of the translucent substrate 12 and the light diffusion layer 18, thereby easily forming the gap parts 22. As a result, the gap parts 22 having the above-described shapes can be easily formed in the light diffusion layer 18.

Next, the shapes of the gap parts 22 are explained in more detail.

The shape of the gap parts 22 in plan view may be an approximately oval shape oriented in the uniaxial direction as shown in FIG. 6A or an approximately circular shape that is not oriented in any specific direction as shown in FIG. 6B. The cross-sectional view shape of the gap parts 22 is a flattened shape, in which the gap parts 22 are stretched and flattened out in a direction X orthogonal to a normal line Y of the optical sheet 10, as stretched in the uniaxial or biaxial direction, as shown in FIG. 5. The "cross-sectional view shape" means a cross-sectional shape of the optical sheet viewed from a direction orthogonal to a direction of the normal line of the optical sheet observed in a plan view shape. Moreover, the "plan view shape" is a shape in plan view in which a three-dimensional shape is projected onto a plane orthogonal to the direction of a view line.

The gap parts 22 shown in FIG. 5 and FIGS. 6A and 6B exist around the micro particles 20. The gap parts 22 may exist around the entire periphery of the micro particles 20 or may partially exist around the periphery of the micro particles 20. When the gap parts 22 partially exist around the periphery, it is preferable that the gap parts 22 exist in as large an area as possible. The gap parts 22 act as air layers, and thus the refractive index of the gap part 22 becomes substantially one. As a result, the light that enters the light diffusion layer 18 can be easily refracted or reflected at the boundary surface between the resin material 19 structuring the light diffusion layer 18 and the gap parts 22, thereby resulting in effective light diffusion. Therefore, the gap parts 22 function to cause the optical sheet 10 to be entirely "defocused" at the end. Improvement of the degree of defocus leads to the effect that suppresses the "nonuniformity of brightness," such as, due to the light from the surface light source device, equal thickness interference fringes, uneven brightness by a visible image of light source, and repeated bright and dark patterns.

The shape of the gap parts 22 is not particularly limited. When the gap parts 22 are formed by the stretching process after the coextrusion of the translucent substrate 12 and the light diffusion layer 18, the contour shape of the gap parts 22 is, as shown in FIGS. 6A and 6B, an approximately oval shape (see FIG. 6A) or an approximately circular shape in plan view (see FIG. 6B). The gap parts 22 having the approximately oval shape as shown in FIG. 6A are oriented in the uniaxial direction and have so-called anisotropic (aeolotropic) characteristics in plan view. On the other hand, the gap parts 22 having the approximately circular shape as shown in FIG. 6B are not oriented in any specific directions in plan view and have isotropic characteristics. The stretching process is performed in a vertical direction and a horizontal direction of the sheet. In general, when stretching in one of the directions is larger, the contour of the gap parts 22 often becomes an approximately oval shape (see FIG. 6A) in plan view.

Figure 7:
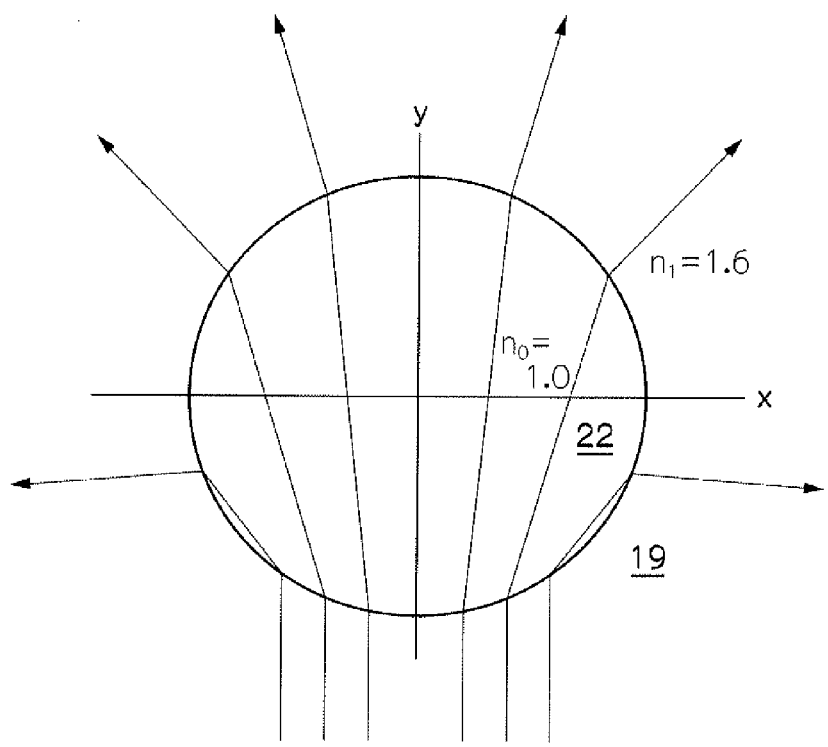
FIG. 7 is a schematic diagram explaining light dispersion characteristics of a gap part included in the light diffusion layer, using a spherical gap part as an example.
Figure 8:
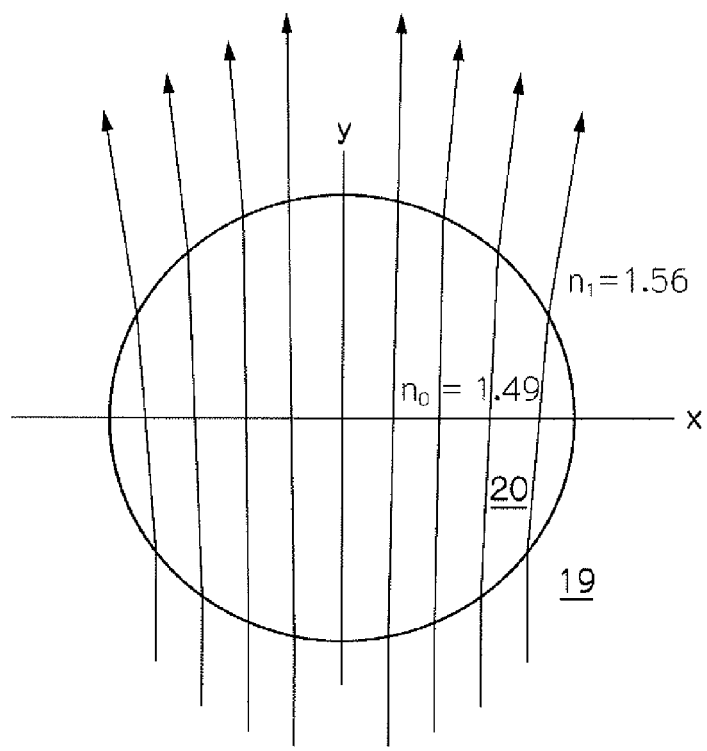
FIG. 8 is a schematic diagram explaining light dispersion characteristics of a micro particle included in the light diffusion layer, using a spherical micro particle as an example.

FIG. 7 is a schematic diagram explaining the diffusion of light by the gap parts included in the light diffusion layer, using a spherical gap part as an example. FIG. 8 is a schematic diagram explaining the diffusion of light by the micro particles included in the light diffusion layer, referring to a spherical micro particle as an example. The light that enters the light diffusion layer 18 in the direction of a normal line of the translucent substrate (corresponding to the direction from the lower part to the upper part of FIG. 7 and FIG. 8) significantly refracts at the boundary surface of the gap parts 22 between the resin material 19 having the refractive index of approximately 1.56 and the gap part 22 having the refractive index of approximately 1.0, as shown in FIG. 7. On the other hand, as shown in FIG. 8, the light is not significantly refracted in the light diffusion layer that does not include the gap parts 22 because the refractive index of the resin material 19 is approximately 1.56, and the refractive index of the micro particles 20 is approximately 1.49. Therefore, the gap parts 22 included in the optical sheet 10 according to this invention can effectively diffuse the light that enters into the light diffusion layer 18 from the direction of the normal line.

Figure 9:
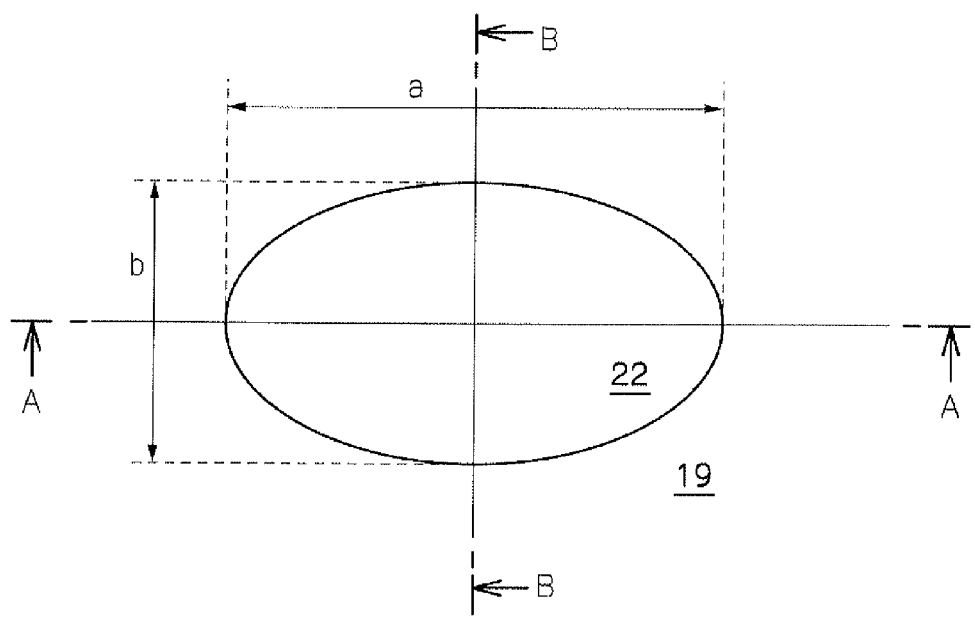
FIG. 9 is a schematic diagram of a plan view of the gap part that actually appears after a stretching process.
Figure 10:
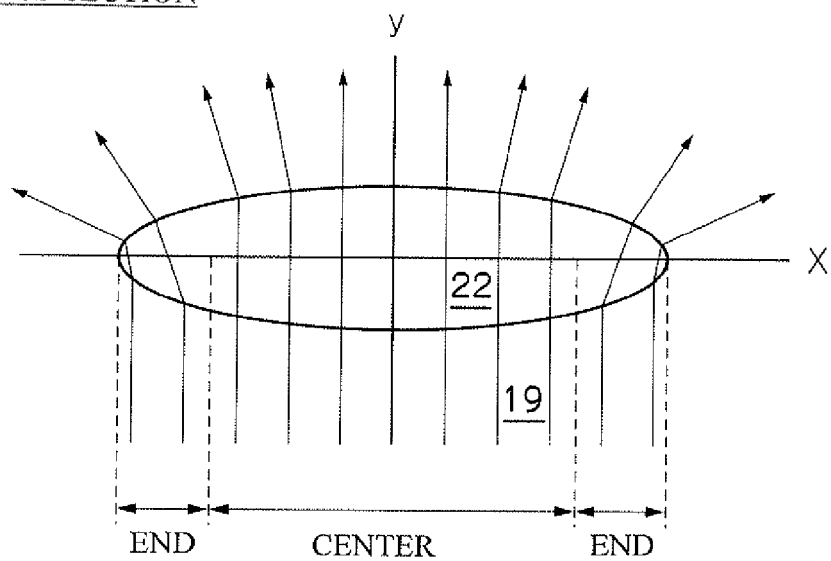
FIG. 10 is a cross-sectional view taken from line A-A in FIG. 9.
Figure 11:
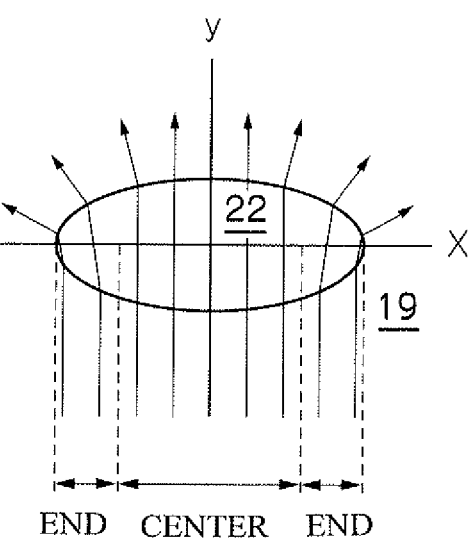
FIG. 11 is a cross-sectional view taken from line B-B in FIG. 9.

FIG. 9 is a schematic diagram of a plan view shape of a gap part that is actually produced after the stretching process. FIG. 10 is a cross-sectional view taken in line A-A in FIG. 9. FIG. 11 is a cross-sectional view taking in line B-B shown in FIG. 9. The gap part 22 produced after the stretching process normally extends in the stretching direction of the translucent substrate 22. The cross-section of the gap part 22 is flattened as shown in FIG. 5, and the plan view shape of the gap part 22 is in an approximately oval shape or an approximately circular shape, as shown in FIGS. 6A and 6B. As shown in FIG. 9, the shape of the gap part 22 defined by "a/b" can be changed arbitrarily by the condition of the stretching process, where "a" is a length in the major axis direction when viewing the gap part 22 in plan view, and "b" is a length of the minor axis. For example, when the gap part 22 is formed only by the uniaxial stretching, either vertical or horizontal stretching is performed at a predetermined scale, so that the gap part 22 can be produced, in which the schematic oval shape thereof extends in the uniaxial direction as shown in FIG. 6A to have strong aeolotropic (anisotropic) characteristics. The scale of stretching under the uniaxial stretching may be larger than one time, preferably about ten times. On the other hand, when forming the gap part 22 by biaxial stretching, the vertical stretching first and then the horizontal stretching, the horizontal stretching first and then the vertical stretching, or the vertical stretching and horizontal stretching at the same time are performed at the predetermined scale to form the gap parts 22 having the isotropically approximately circular shape as shown in FIG. 6B. In the biaxial stretching, the shape of the gap parts 22 may be adjusted by adjusting the stretching scale for the vertical direction and the stretching scale for the horizontal direction. Therefore, the shape can be adjusted in a large range, from the circular shape to an approximately oval shape. The scale of stretching under the biaxial stretching may be larger than one time, preferably about ten times.

By forming the gap parts 22 in an approximately oval shape having anisotropic and aeolotropic characteristics in the light diffusion layer 18 as shown in FIG. 6A, the aeolotropic characteristics are provided in the diffusion of light of the light diffusion layer 18. The center part of the upper and lower sides (sides in the normal direction Y of the translucent substrate) of the approximately oval shaped gap part 22 viewed from the major axis direction is in a form close to a relatively flattened shape. Because of this, a majority of the light that enters from the normal line direction, which is refracted at the boundary surface of the gap part 22 and is transmitted therethrough, passes through the optical element 16 side as slightly refracted at the relatively flattened, long upper and lower sides of the center part. On the other hand, both ends of the approximately oval shaped gap part 22 have a larger refractivity of light entering the boundary surface at an angle close to the normal line direction y of the optical sheet. As shown in FIG. 10, the light exits to the left and right as being strongly diffused light. Both ends include the ends of the gap part 22 and have a small radius of curvature (R), thereby substantively refracting and diffusing the entered light. Therefore, as shown in FIG. 10, in the major axis direction of the gap part 22, the light diffusion is not strong at the center part, which shares a major percentage of the gap part 22. Accordingly, a significant amount of light can be transmitted without substantially diffusing the light, resulting in a characteristic that a certain degree of brightness can be secured.

The approximately oval shaped gap part 22 as seen in the minor axis direction has a short center part in the upper and lower sides (sides in the normal line direction Y of the translucent substrate) as shown in FIG. 11, which is not flat compared with the example shown in FIG. 10. In addition, both ends, at which the refractivity of the light entering to the boundary surface at an angle close to the normal line direction y of the optical sheet becomes large, have a relatively large percentage of a gap part 22. As a result, as shown in FIG. 11, the light that enters from the normal line direction and is refracted and transmitted through the gap part 22, is significantly refracted at the ends and has a large percentage exiting from the left and right of the gap part 22 as strongly diffused light. Therefore, as shown in FIG. 11, there is a characteristic that relatively strong light diffusion occurs in the minor axis direction of the gap part 22.

In summary of these characteristics, when the light enters in the major axis direction of the flattened, oval shaped gap part 22 in a cross-section as shown in FIG. 10, both ends contribute to the refraction of light in the major axis direction of the gap parts 22. The length of both ends contributing in a single gap part 22 is approximately proportional to the length of the minor axis. Similarly, as shown in FIG. 11, when the light enters in the minor axis direction of the flattened, oval shaped gap part 22 in the cross section, both ends contribute to the refraction of light in the minor axis direction of the gap part 22. The length of both ends contributing in a single gap part 22 may be approximately proportional to the length of the major axis. As a result, when the shape of the gap parts 22 is oval, the minor axis direction component of the transmitted light is strongly diffused, and the diffusion of light becomes anisotropic. In other words, it is possible to provide the diffusion of light with aeolotropy. The aeolotropy of the diffusion of light may be controlled by controlling a ratio a/b, wherein "a" represents the major diameter and "b" represents the minor diameter of the gap part 22. As the ratio a/b become large, the aeolotropy of the diffusion of light becomes larger.

The number, shape, size, volume and the like of the gap parts 22 are not particularly limited and may be arbitrarily adjusted in consideration of the desired normal line brightness, image contrast value, Hayes value and the like. For example, when the degree of defocus is to be increased by decreasing the image contrast value, the number, shape, size, volume and the like of the gap part 22 may be increased to adjust the light diffusion to be increased. In contrast, when the degree of defocus is to be decreased by increasing the image contrast value, the number, shape, size, volume and the like of the gap part 22 may be decreased to adjust the light diffusion to be lowered. The number of gap parts 22 may be adjusted by the number of micro particles 20 included in the light diffusion layer 18. The shape and size of the gap parts 22 may be adjusted and configured by, for example, determining whether to perform the stretching process uniaxially or biaxially, or the degree of stretching (called stretching scale or stretching degree) when the gap parts 22 are generated by the stretching process. The volume of the gap parts 22 may be adjusted by the size of the micro particles 20 and the degree of stretching (stretching degree).

The thickness of the light diffusion layer 18 of such structure is not particularly limited but normally falls within a range of 5 μm to 30 μm.

The light diffusion layer 18 may be produced in various ways. Preferably, as discussed above, the light diffusion layer 18 may be produced by providing a resin material in which the micro particles 20 are dispersed, coextruding the resin material with the extrusion material for the translucent substrate 12 or applying the resin material on the translucent substrate 12, and performing the uniaxial or biaxial stretching process on the obtained sheet. By such stretching process, the boundary surface between the micro particles 20 and the resin structuring the light diffusion layer 18 is peeled away (separated) so that the gap parts 22 are formed.

Figure 12:
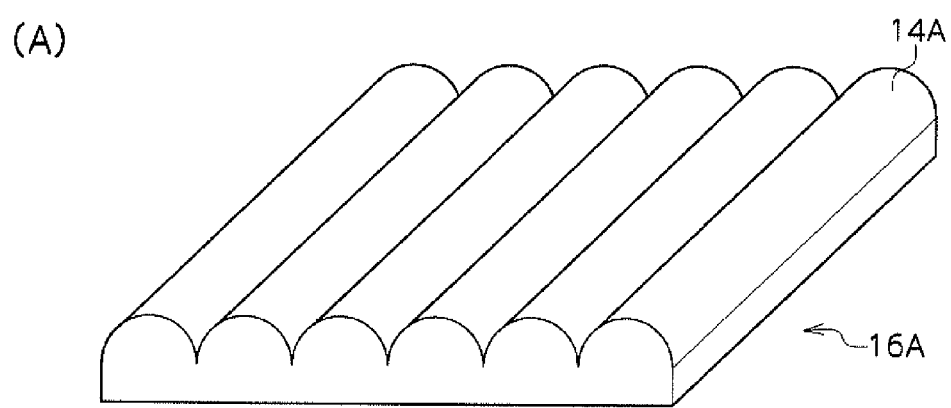
FIGS. 12A and 12B are a schematic perspective view illustrating another exemplary embodiment of an optical element.
Figure 12:
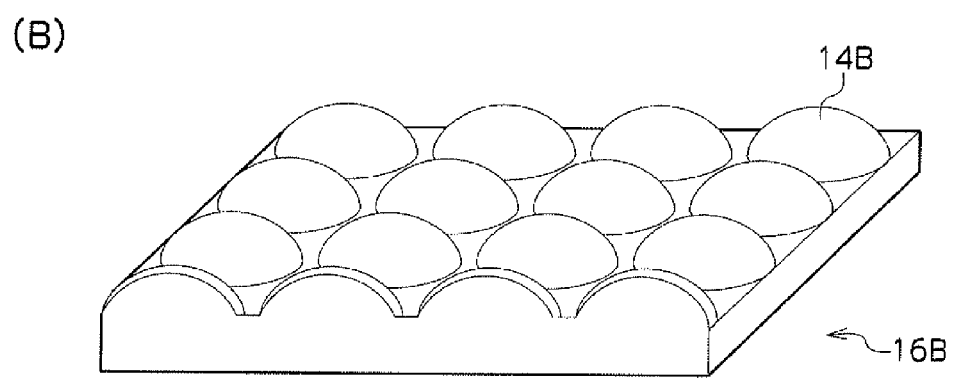

(Optical element) The optical element 16 is provided on a surface S1 of the translucent substrate 12 with a plurality of unit prisms 14 or unit lenses (see reference numbers 16A and 16B in FIGS. 12A and 12B as discussed below) arranged thereon. The optical element 16 may be a prism group in which the unit prisms 14 each having a triangular prism shape are arranged so that their ridge lines are in parallel with each other, as shown in FIGS. 1 to 3. In addition, the optical element 16 may be a lens group in which a large number of the unit lenses 14A are arrayed as shown in FIG. 12A. The unit lenses 14A have a cylindrical outer shape of which the cross-section is approximately hemispherical. Furthermore, the optical element 16 may be a fly-eye lens 16B, in which a large number of unit lenses 14B each with an approximately hemispherical protrusion is two-dimensionally arrayed, as shown in FIG. 12B. The cross-sectional shape of the unit prisms 14 or unit lenses 14A, 14B may be a circular shape, an oval shape, cardioid, Rankine's egg shape, a cycloid shape, a continuous and smooth curvature such as involute curve, or a portion or entirety of a polygonal shape, such as a triangle, rectangle, pentagon or hexagon. The unit lenses 14A, 14B may be convex lenses as shown in FIGS. 12A and 12B or concave lenses (not shown).

The optical sheet 10 having the optical element 16 may be a single piece. Alternatively, two optical sheets 10 having the optical element 16 may be used in a stack such that the ridge lines of the optical element 16 on the optical sheets 10 are orthogonal to each other, in order to control the angle of light diffusion in two directions (up-down direction and left-right direction) using the cylindrical lenses. The direction of the lens surfaces may be in the same direction in the both optical sheets to provide higher light translucency and be thus more preferable. However, the optical sheets 16 may be structured so that the surfaces on which the optical element 16 is provided face each other.

As materials for structuring the optical element 16, the following is available: thermoplastic resins, for example, (meth)acrylic acid ester homopolymers, such as polymethyl (meth)acrylate and polybutyl(meth)acrylate, (meth)acrylic acid ester copolymer, such as methyl (meth)acrylate-butyl (meth)acrylate copolymer (here "(meth)acrylic acid" includes acrylic acid and methacrylate), polyester, such as polyethylene terephthalate and polybutylene terephthalate, polycarbonate, polystyrene, and polymethylpentene. Further, the following is also used: for example, transparent resins cross-linked by ultraviolet radiation or electron beams, (meth)acrylate, such as multifunctional urethane (meth)acrylate and polyester (meth)acrylate, and unsaturated polyester, transparent glass and transparent ceramics etc. The thickness from the lens vertex to a flat part of the optical element 16 is normally approximately 20 μm to 1,000 μm.

The method for forming the optical element 16 may be, for example, the known heat-press method (publication of Japanese laid-open application number S56-157310), a method in which the unit prisms or unit lenses are embossed on a ultraviolet-curable thermoplastic resin film by a roll emboss plate and the film is cured by irradiating ultraviolet light thereon (publication of Japanese laid-open application number S61-156273), or a method to form the unit prisms or unit lenses on a film translucent substrate using a roll concave plate, in which, after applying ultraviolet or electron beam-curable resin liquid and filling in a concave part of a rotating roll concave plate having a shape of the unit prisms or unit lenses, a film-shaped translucent substrate covers over the resin liquid on the roll concave plate, and the resin liquid is hardened by irradiating ultraviolet radiation or electron beam. The translucent substrate and the unit prism or unit lens are peeled off the roll concave plate thereafter. (Japanese laid-open application number H3-23383; U.S. Pat. No. 4,576,850).

The translucency required by the optical element 16 may be at a level that does not cause a problem in use for various purposes and is preferably colorless and transparent. However, it may be colored and transparent or matt and semi-transparent depending on the use. Matt and semi-transparent may be a characteristic that diffuses and transmits the transmitted light substantially equally isotropically in any direction within a half solid angle, and may be a synonymous with isotropic diffusion of light.

With the optical sheet 10 of this invention according to the above-discussed structural elements, because the light diffusion layer 18 having the gap parts 22 as the light diffusion element is provided between the surface S1 of the translucent substrate 12 and the optical element 16 and/or on the other surface S2 of the translucent substrate 12, the light that enters the light diffusion layer 18 is refracted or reflected at the boundary surface of the gap parts 22. Because the refractive index of the gap parts 22 is substantially one, the diffusion of light effective occurs due to existence of the gap parts 22, thereby suppressing the nonuniformity of brightness caused by, for example, the interference fringe as the light becomes entirely "defocused."

When translucent micro particles 20 are included in the light diffusion layer 18, the light that enters to the light diffusion layer 18 is transmitted therethrough without being absorbed by the micro particles 20. As a result, the entered light can be transmitted to the optical element side 16 without being substantially attenuated, thereby preventing a decrease in brightness as much as possible.

(Relationship between the light diffusion of the light diffusion layer and the optical element) The diffusion of light of the optical sheet according to this invention may be anisotropic by forming the gap parts 22 in a form shown in FIG. 6A or may be isotropic by forming the gap part 22 in a form shown in FIG. 6B.

The "anisotropic diffusion of light" is a characteristic obtained when the light diffusion layer 18 is provided with the gap parts 22 having an approximately oval shape, as a plan view shape, that is oriented in the uniaxial direction, as shown in FIG. 6A. The anisotropic diffusion of light can be confirmed by measuring the optical sheet 10 from which the optical element 16 is removed. More specifically, the diffusion of light can be confirmed by forming an optical sheet, on which the optical element 16 structuring the optical sheet 10 of this invention is scraped off to remove the function of the optical element 16, or on which a transparent material of the same material, or having the same refractive index, as the optical element 16, is applied to remove the function of the optical element 16 (hereinafter such an optical sheet is referred to as "substrate sheet"), irradiating a linear light in parallel with the normal line of the substrate sheet, and measuring the light diffusion of the transmitted light that is the straight light transmitted through the base sheet. In this case, the substrate sheet having the light diffusion layer 18, in which the plan view shape of the gap parts 22 is approximately oval and oriented in the uniaxial direction, is anisotropic as the diffusion of light measured on a plurality of virtual lines that are orthogonal to the normal line becomes higher in certain directions.

By representing the diffusion of light at this time by a light diffusion curve represented by brightness and diffusion angle, the direction in which the virtual line, which indicates the maximum half bandwidth of the half bandwidths obtained from the light diffusion curve (that is, the direction in which the diffusion characteristics become maximum), matches, or approximately matches, the direction orthogonal to the major axis direction of the gap parts 22 formed of an approximately oval shape oriented in the uniaxial direction in plan view. The matching or approximate matching of these directions originates from the shape of the approximately oval gap parts 22. More specifically, as discussed above, with respect to the approximately oval gap parts 22, the ends (contour part) having a small radius of curvature (R) achieves high diffusion. This is because the percentage of the ends is higher in a direction orthogonal to the major axis direction of the approximately oval gap parts 22 oriented in the uniaxial direction, compared to a direction parallel to the major axis direction of the approximately oval gap parts 22.

On the other hand, the "isotropic diffusion of light" is a characteristic obtained when the light diffusion layer 18 is provided in which the plan view shape of the gap parts 22 is approximately circular as the gap parts 22 do not prominently extend in specific directions, as shown in FIG. 6B. The isotropic diffusion of light can be confirmed by measuring the optical sheet 10 without the optical element 16. More specifically, similar to the above description, the diffusion of light can be confirmed by forming a substrate sheet, on which the optical element 16 structuring the optical sheet 10 of this invention is scraped off to remove the function of the optical element 16, or on which a transparent material of the same material, or having the same refractive index, as the optical element 16, is applied to remove the function of the optical element 16, irradiating a linear light in parallel with the normal line of the substrate sheet, and measuring the light diffusion of the transmitted light that is the linear light transmitted through the base sheet. In this case, the substrate sheet having the light diffusion layer 18 in which the plan view shape of the gap parts 22 is approximately circular is isotropic as the diffusion of light measured on a plurality of virtual lines that are orthogonal to the normal line is not significantly different.

Similar to the above description, by representing the diffusion of light at this time by a light diffusion curve represented by brightness and diffusion angle, the half bandwidths obtained by the light diffusion curve are not different in each virtual line. This is originated from the shape of the approximately circular gap parts 22. More specifically, of the approximately circular gap parts 22, the ends (contour part) having a small radius of curvature (R) achieve high diffusion. The percentage of the ends causes the diffusion of light to be isotropic.

Figure 13:
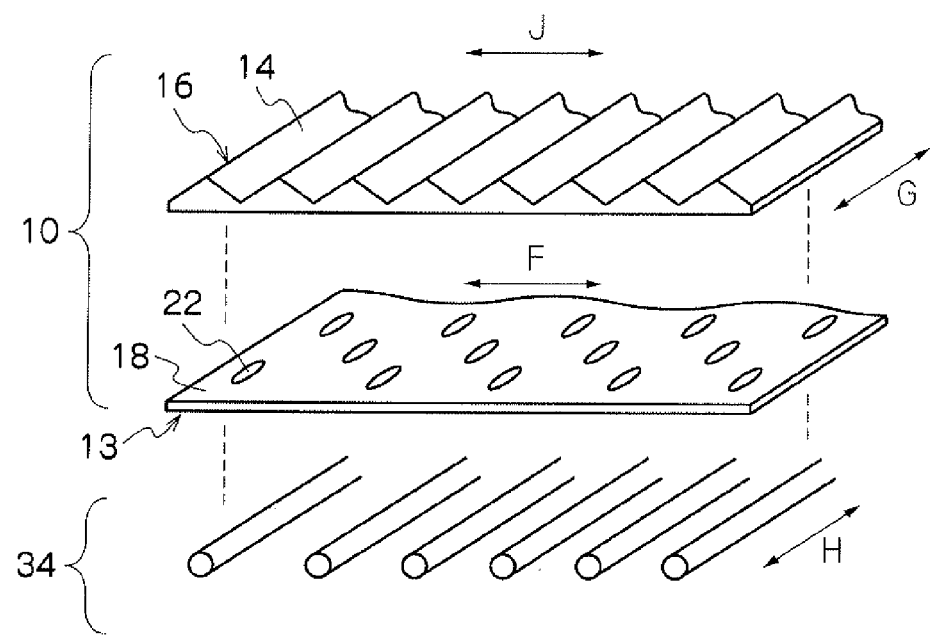
FIG. 13 is a structural diagram explaining relationships of an optical element and a light diffusion layer of the optical sheet according to this invention, and a light source combined with the optical sheet according to this invention.
Figure 14:
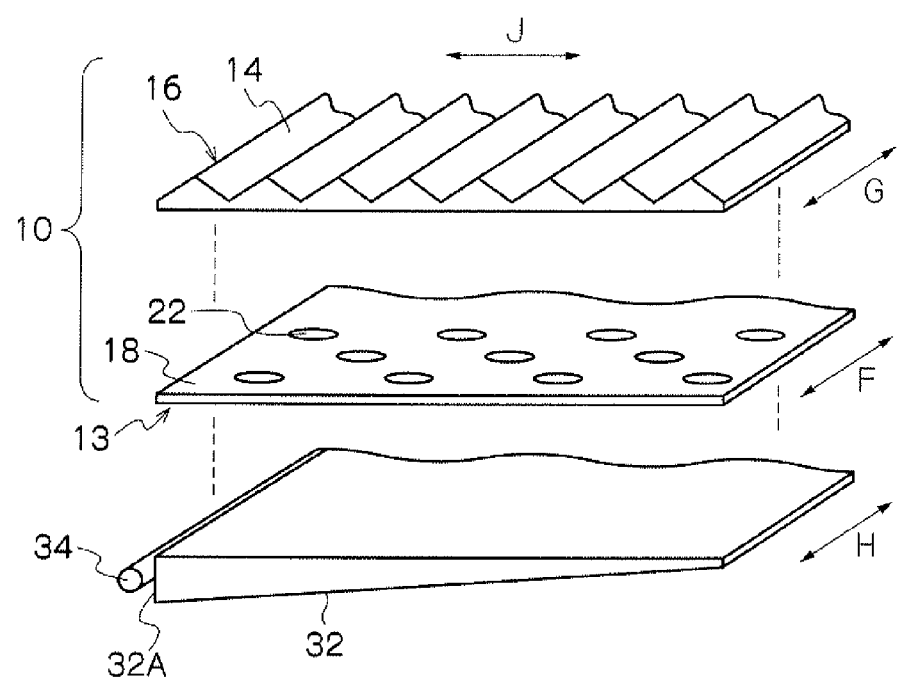
FIG. 14 is a structural diagram explaining relationships of the optical element and the light diffusion layer of the optical sheet according to this invention, and another light source combined with the optical sheet according to this invention.

FIG. 13 and FIG. 14 are structural diagrams explaining the relationships between the optical element and the light diffusion layer that the optical sheet of this invention is provided with, and the light source combined with the optical sheet of this invention. FIG. 13 is a structural diagram illustrating a case in which a direct-light type backlight unit is combined as the light source. FIG. 14 is a structural diagram illustrating a case in which an edge-light type backlight unit is combined as the light source. Because the optical sheet 10 of this invention is provided with aeolotropy of the diffusion of light (anisotropic light diffusion), the optical sheet 10 can be arbitrarily used depending on the type of the light source to be combined as shown in FIGS. 13 and 14. For example, when the light source has uneven brightness having directionality, the uneven brightness can be canceled out and effectively defocused by using the optical sheet 10 of this invention to increase the diffusion in the direction of the uneven brightness of the light source.

As shown in FIG. 13, when structuring the direct-light type backlight unit by positioning the light source 34 including a plurality of cold-cathode tubes on the backside of the optical sheet 10, in general, the longitudinal direction H of the cold-cathode tubes and the ridge line direction G of the unit prisms 14 (or unit lenses) that the optical element 16 is equipped with are positioned so as to be in parallel or approximately parallel with each other. In this case, when the diffusion of light for the substrate sheet 13 having the anisotropic light diffusion layer 18 is represented by a light diffusion curve represented by brightness and diffusion angle, it is preferable that the direction F in which a virtual line extends and the ridge line direction G of the unit prisms 14 (or unit lenses) structuring the optical element 16 are orthogonal or approximately orthogonal to each other, as shown in FIG. 13. Herein, the vertical line indicates the maximum half bandwidth among the half bandwidths obtained from the light diffusion curve, Because the so-structured direct-light type backlight unit is structured such that the direction F, in which the light diffusion layer 18 provides the maximum diffusion of light (that is, the direction in which the virtual line indicating the maximum half bandwidth extends), and the ridge line direction G of the unit prisms 14 are orthogonal or approximately orthogonal to each other, generation of the stripe-shaped uneven brightness originated from the light source 34 structured by cold-cathode tubes structuring the direct-line type backlight unit, can be effectively prevented.

In contrast, as shown in FIG. 14, when the edge-light type backlight unit is structured in which a light guide body 32 is provided on the backside of the optical sheet 10 and a linear light source 34 is provided on the side surface 32A of the light guide body 32, the longitudinal direction H of the linear light source 34 and the ridge line direction G of the unit prisms 14 (or unit lenses) that the optical element 16 are equipped with, are normally positioned so as to be in parallel with or approximately parallel with each other. In this case, when the diffusion of light for the substrate sheet 13 having the anisotropic light diffusion layer 18 is represented by a light diffusion curve represented by brightness and diffusion angle, it is preferable that the direction F (in which the virtual line extends and which indicates the maximum half bandwidth of the half bandwidths obtained from the light diffusion curve) and the ridge line direction G of the unit prisms 14 (or unit lenses) structuring the optical element 16 are structured to be orthogonal or approximately orthogonal each other, as shown in FIG. 14.

Because the edge-light type backlight unit is structured such that the direction F, in which the light diffusion layer 18 provides the maximum diffusion of light (that is, the direction in which the virtual line indicating the maximum half bandwidth extends), and the ridge line direction G of the unit prisms 14 are orthogonal or approximately orthogonal to each other, generation of the stripe-shaped uneven brightness in the width direction of the linear light source 34 originated from the structure of the light source of the edge-line type backlight unit can be effectively prevented.

As explained above, the positional relationship between the light diffusion layer 18 having anisotropic light diffusion and the optical element 16 is designed in correspondence with the light source to be used. Thereby, the problem of the nonuniformity of brightness originated from the structure of the light source can be resolved.

In the above descriptions, the ridge line direction G of the unit prisms 14 is a direction orthogonal to the arrangement direction J of the unit prisms 14. In addition, the direction F, in which the light diffusion layer 18 has the maximum diffusion characteristics (that is, the direction in which the virtual line indicating the maximum half bandwidth extends) discussed above, is a direction orthogonal to the direction of the major axis of the approximately oval gap part 22 arranged in the uniaxial direction. Moreover, in the above descriptions, the diffusion of light is measured by removing the optical element 16 from the completed optical sheet 10. However, as discussed in the below embodiment, the diffusion of light of another substrate sheet 71 that is one before the optical element 16 is formed thereon (the sheet on which the gap parts 22 also are formed after the stretching process) may be measured in the manufacturing process of the optical sheet 10 so that the anisotropy and isotropy of the light diffusion can be confirmed.

(Characteristics of optical sheet) The image contrast value of the optical sheet 10 of this invention formed of the above-described structural elements (i.e. "substrate sheet 13" in which the light diffusion layer 18 having the gap parts 22 is formed on the translucent substrate 12) measured by a method standardized by JIS K 7374 using an optical sheet from which the optical element 16 is removed, is preferably equal to or less than 15 with a slit pitch of 0.5 mm, and more preferably equal to or less than 10. The Hayes value measured by the method standardized by JIS K 7361-1 is preferably equal to or greater than 20% and equal to or less than 95%. Because the optical sheet 10 and the substrate sheet 13 structuring the optical sheet 10 include the light diffusion layer 18 having the gap parts 22 as the light diffusion element, the optical sheet 10 has optical characteristics that fall within the above ranges. Therefore, the obtained optical sheet 10 provides sufficient brightness and defocus. The image contrast value and the Hayes values are adjustable mainly depending on the size of the gap part 22 structuring the light diffusion layer 18. In addition, the normal line brightness is comparatively determined as a relative value for the conventional optical sheet as discussed in the below embodiment, and is preferably equal to or greater than 96% where the conventional optical sheet is considered to be 100%.

The image contrast value is not obtained by measuring the obtained optical sheet 10 but obtained by measuring the substrate sheet (i.e., referring to the substrate sheet 13 formed by the light diffusion layer 18 having the gap parts 22 formed therein or the substrate sheet 13 after removing the optical element 16 from the optical sheet 10) using a method standardized by JIS K 7374. The image contrast value is determined as a result of measurement by placing the a slit plate, in which slits of an arbitrary width, such as 0.125 mm, 0.5 mm 1.0 mm and 2.0 mm, is formed, in front of a light receiving part, and measuring the percentage of light transmitted through the slit plate, among the light emitted from the light source and transmitted through an object subject to the measurement. The smaller the image contrast value is, the more improved the level of defocus is, thereby suppressing the generation of nonuniformity of brightness due to interference fringe or the like. However, the larger the value is, the more decreased the level of defocus is, causing the generation of nonuniformity of brightness due to interference fringes or the like. Moreover, the Hayes value is determined from a result of measurement in accordance with JIS K 7361-1 using a sampled 60 mm×60 mm section obtained from the center of the substrate sheet 13 measured by a light beam transmissometer (manufactured by Murakami Color Research Laboratory Co., Ltd.; model: HM-150). The normal line brightness is determined from a result of measurement by a minute deviation luminance meter that is a device to measure brightness for each light beam exit angle, and the larger the value is, the brighter an image is seen.

In the above descriptions, the optical sheet from which the optical element 16 are removed is exemplarily illustrated by the substrate sheet 13 after removing the function of the optical element 16 by scraping off the optical element 16 structuring the optical sheet 10, or the substrate sheet 13 after removing the function of the optical element 16 by applying onto the optical element 16 a transparent material of the same material or having the same refractive index as that of the optical element 16.

(Other layers) On the optical sheet 10, a light diffusion layer (not shown) may be provided on the surface opposite from the optical element 16 (may be referred to as other surface S2). For example, when the light diffusion layer 18 is formed on both surfaces S1 and S2 of the translucent substrate 12 as shown in FIG. 3, a typical light diffusion layer instead of the light diffusion layer 18 on the rear surface S2 may be provided. Such a typical light diffusion layer is configured at least to have a function to diffuse the light and may be formed on a generic light diffusion sheet. For example, a layer may be used in which light diffusion particles having a particle diameter of 1 μm to 30 μm dispersed in the resin, such as those proposed by the above Patent References 2 and 3.

The light diffusion layer is formed by applying, spraying, or roll-coating a paint configured in which light diffusion particles are dispersed in a translucent binder resin. As the material for the light diffusion particles, polymethacrylate methyl (acrylic) series beads, polybutylmethacrylate series beads, polycarbonate series beads, polyurethane series beads, calcium carbonate series beads, or silica series beads may be used. As the translucent binder resin, transparent materials, such as acryl, polystyrene, polyester, and vinyl copolymer, may be used. The thickness of the light diffusion layer is normally in a range of 1 μm to 20 μm.

(Optical sheet manufacturing method) The optical sheet 10 may be manufactured by various methods. For example, the optical sheet 10 may be obtained by forming one or both sides of the optical diffusion layer 18 after preparing a sheet-shaped translucent substrate 12, or by forming the two layers simultaneously by coextrusion, and forming the optical element 16 thereafter. When the translucent substrate 12 and the light diffusion layer 18 are formed separately, the optical sheet 10 may be produced by applying and drying the resin liquid for the light diffusion layer on one or both sides of the sheet-shaped translucent substrate 12 and forming the light diffusion layer 18 the translucent substrate 12 after extruding the translucent substrate 12. Then, the translucent substrate 12 and the light diffusion layer 18 are stretched to form the light diffusion layer 18 having the gap parts 22 around the micro particles 20 to form the optical element 16. When the translucent substrate 12 and the light diffusion layer 18 are simultaneously formed, a sheet-shaped translucent substrate 12 and the light diffusion layer 18 are simultaneously coextruded and stretched so that the light diffusion layer 18 having the gap parts 22 around the micro particles 20 is formed, then the optical element 16 is formed and the forming processes are done.

The optical element 16 may be produced by, for example, a heat-press method using a thermoplastic resin as disclosed in Japanese laid-open patent application number S56-157310, an extrusion molding method, or an injection molding method using an ultraviolet or heat-hardening resin. Other production methods include, for example, a method disclosed in Japanese laid-open patent application number H5-169015. In this method, a shaping roll having a shaping die of the optical element 16 formed by a desired lens array is filled with ionizing radiation-hardening resin liquid. The shaping roll is placed over the translucent substrate 12, on which the light diffusion layer 18 is formed after the stretching process. The ionizing radiation, such as ultraviolet radiation or electron beams, is directly irradiated from the translucent substrate 12 side, to harden the ionizing radiation-hardening resin liquid. Thereafter, by peeling those from the shaping roll, the optical sheet 10 on which the optical element 16 formed of the hardened ionizing radiation-hardening resin is formed, can be produced.

(Other forms of the optical sheet) In the above explanations, the translucent substrate 12 and the light diffusion layer 18 are formed clearly as separate layers as shown in FIGS. 1-4, as a representative form of the optical sheet 10 according to this invention. In addition, the translucent substrate 12 and the light diffusion layer 18 are illustrated as an example to be produced as separate layers using a fusion coextrusion method or the like. However, this invention is not limited to these forms. That is, as discussed above, "the light diffusion layer is provided on one and/or the other surface of the translucent substrate" may mean at least that at least an area near the one and/or other surface of the translucent substrate is formed as the light diffusion layer as specified in this invention.

Therefore, the translucent substrate, which is originally a single layer, may include the gap parts near one of the surfaces. In addition, the translucent substrate, which is originally a single layer, may include the gap parts continuously formed from one surface to the other of the translucent substrate. In other words, in this case, the optical element may be directly accumulated on any one surface of the single light diffusion layer.

In summary, the optical sheet according to this invention may be an optical sheet structured to include a translucent substrate, in which gap parts are formed as the light diffusion element near one of the surfaces or from one surface to the other surface of the translucent substrate, and an optical element in which a plurality of unit prisms or unit lens are arrayed. The optical sheet of this form may include the same structural elements as the optical sheet as shown in FIGS. 1-4 and may produce the same operational effects as such optical sheet.

Figure 15:
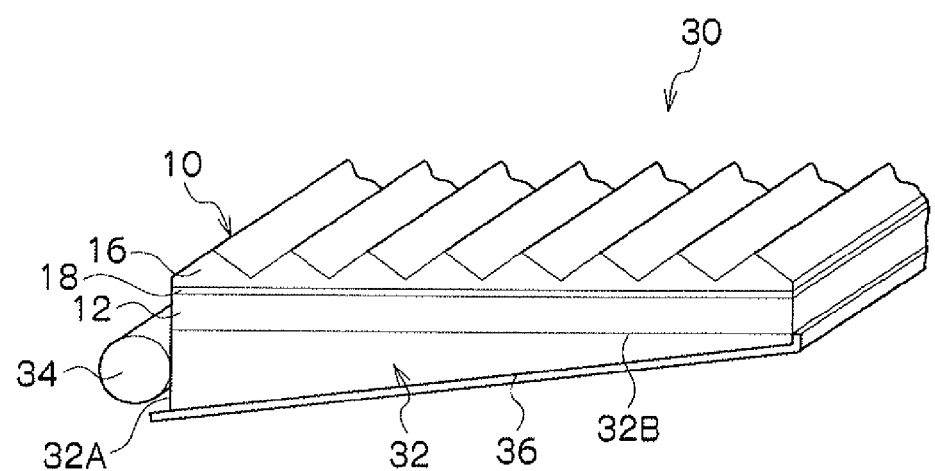
FIG. 15 is a perspective view illustrating an example of a surface light source device according to the first embodiment of this invention.

[Surface Light Source Device] FIG. 15 is a perspective view illustrating an example of a surface light source device according to the first embodiment of this invention. The surface light source device 30 according to the first embodiment of this invention is so-called an edge-light type surface light source device, which includes a light guide body 32 including at least one side surface 32A through which light enters and a light discharge surface 32B which is another surface and through which light exits, a light source 34 that irradiates the light into the at least one side surface 32A of the light guide body 32, and the optical sheet 10 provided on the light discharge surface 32B of the light guide body 32 through which the light exiting from the light discharge surface 32B is transmitted.

The light guide body 32 is a plate-shaped body formed of a translucent material, and in FIG. 15, the light guide body 32 is structured to cause the light introduced by the left-side side surface 32A to exit from the upper light discharge surface 32B. The light guide body 32 is formed of the same translucent material as the material for the optical sheet 10, which is normally formed of an acrylic or polycarbonate resin. The thickness of the light guide body is normally about 1 μm-10 μm, and may be constant through the entire area. As shown in FIG. 15, the thickness may be the highest at the side surface 32A of the light source side 34, or alternatively, the thickness may taper off towards the other side.

The light guide body 32 preferably includes a light diffusion function inside of and on a surface of the light guide body 32 in order to cause the light to exit from a wide surface (light discharge surface 32B).

The light source 34 introduces the light inside the light guide body 32 from the at least one side surface 32A and is positioned along the side surface 32A of the light guide body 32. The light source 34 is not limited to a linear light source as shown in FIG. 15 but may be point light sources, such as filament lamps and LEDs (light emitting diode) positioned linearly along the side surface 32A. In addition, a plurality of small flat fluorescent lamps may be positioned along the side surface 32A.

On the light discharge surface 32B of the light guide body 32, the above-discussed optical sheet 10 according to this invention is provided. In general, the optical sheet 10 is provided so as to be placed on the light discharge surface 32B. However, it is not limited to this form. The optical sheet 10 is provided such that the surface opposite from the optical element 16 is provided to face the light discharge surface 32B of the light guide body 32. A detailed description of the optical sheet 10 is omitted as it has been explained above.

A light reflection plate 36 is provided on a surface of the light guide body 32 opposite from a light discharge surface 32B and on side surfaces except the left-side side surface 32A. The light reflection plate 36 reflects the light exiting from these surfaces to the inside of light guide body 32. A thin metal plate deposited with aluminum and the like, a white foamed PET (polyethylene terephthalate) or the like, may be used as the light reflection plate 36.

Figure 16:
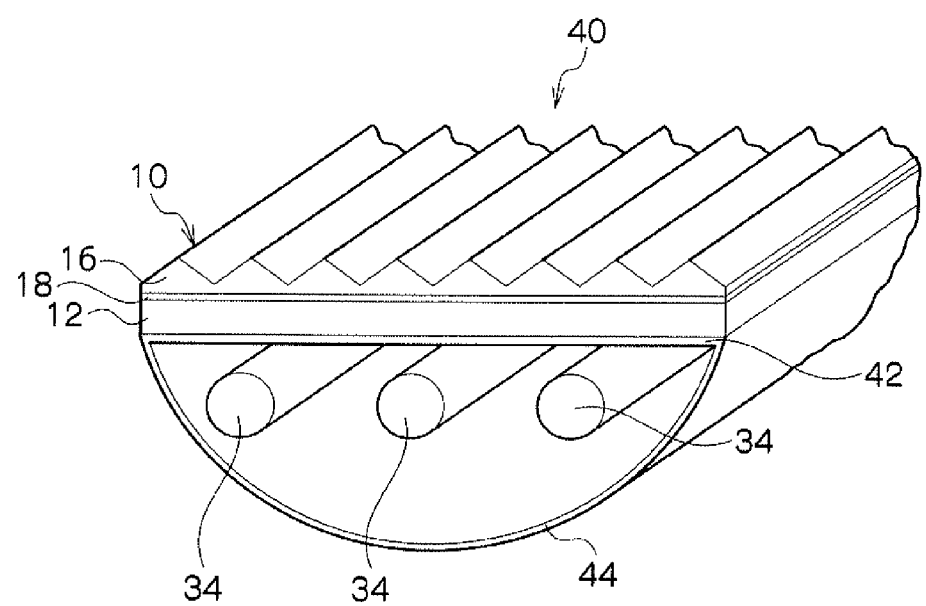
FIG. 16 is a perspective view illustrating an example of a surface light source device according to the second embodiment of this invention.

FIG. 16 is a perspective view illustrating an example of the surface light source device according to the second embodiment of this invention. The surface light source device 40 according to the second embodiment of the invention is a direct-light surface light source device, which includes the optical sheet 10 of this invention, a light source 34 that irradiates light to the optical sheet 10 from the surface opposite from the optical element 16, a concave reflection body 44 that is positioned on the opposite side of the light source 34 from the optical sheet and reflects the light from the light source 34 towards the direction of the optical sheet 10. A detailed description of the optical sheet 10 is omitted as it has been explained above.

The light from the light source 34 includes light irradiated to a light discharge surface 42 on the optical sheet 10 side so as to be transmitted through the optical sheet 10, and light reflected by the reflection body 44 to be directed to the light discharge surface 42 and transmitted through the optical sheet 10.

Similar to the above-discussed surface light source device of the first embodiment, a thin metal plate deposited with aluminum and the like, a white formed PET (polyethylene terephthalate) or the like, may be used as the light reflection plate 44. The shape of the light reflection plate 44 may be one that is capable of uniformly reflecting the light from the light source 34 as parallel beams and may be selected from shapes, such as a concave arc shape, a parabolic cylindrical shape, a hyperbolic cylindrical shape, elliptic cylindrical shape, and the like.

Figure 17:
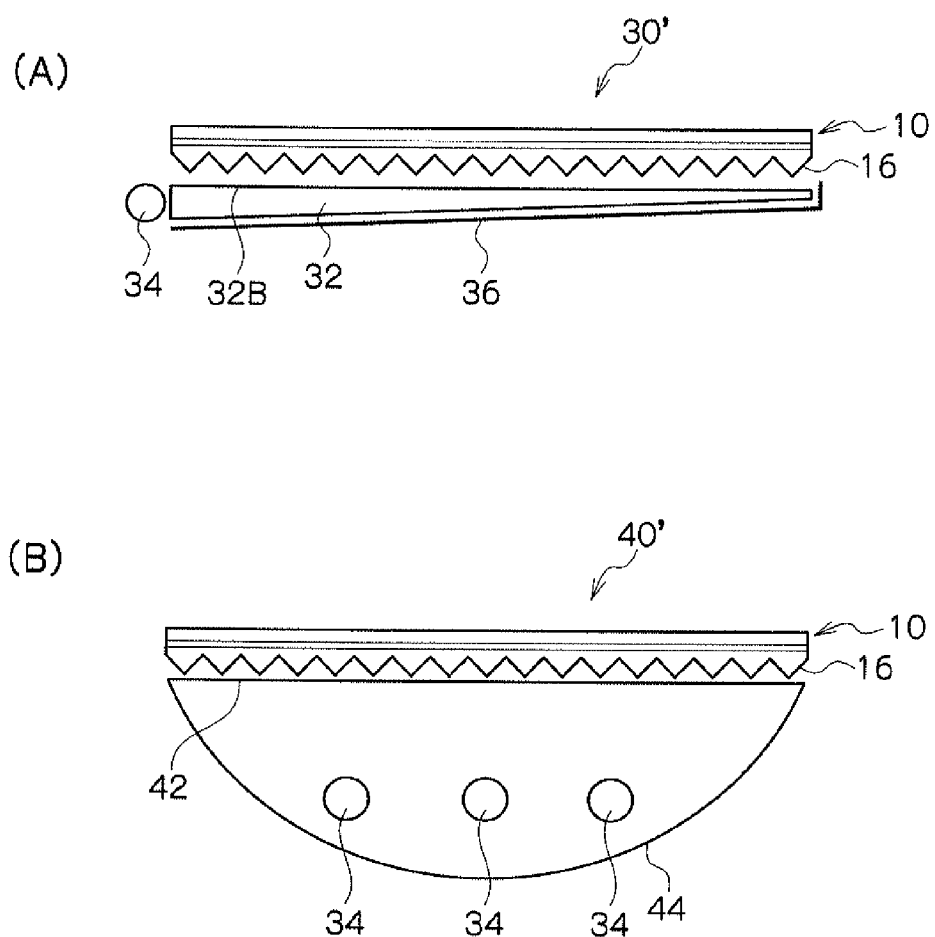
FIGS. 17A and 17B are a transparent sectional view illustrating another example of the surface light source device according to the first and second embodiment of this invention.

FIGS. 17A and 17B are a transparent cross-sectional view illustrating another example of the surface light source device according to the first and second embodiments of this invention. FIG. 17A shows another example of the surface light source device according to the first embodiment, and FIG. 17B shows another example of the surface light source device according to the second embodiment. The surface light source device 30' shown in FIG. 17A is different from the surface light source device 30 shown in FIG. 15 in which the optical element 16 configuring the optical sheet 10 is in a different orientation. The optical element 16 may be provided on the side in which the light exits towards the optical sheet 10 from the light source 34, that is, on the side of the light discharge surface 32B of the light guide body 32. In addition, the surface light source device 40' as shown in FIG. 17B is different from the surface light source device 40 shown in FIG. 16 in that the optical element 16 structuring the optical sheet 10 is facing in a different direction. The optical element 16 structuring the optical sheet 10 may be provided on the side in which the light exits to the optical sheet 10 from the light source 34, that is, on the side of the light discharge surface 42 of the optical sheet 10 side.

As another embodiment of the surface light source device according to this invention, instead of the optical sheet 10 according to the embodiments shown in FIGS. 1-4, a surface light source device may utilize an optical sheet including a translucent substrate in which gap parts are formed as a light diffusion element near one of the surfaces or from one surface to the other, and an optical element provided on one of the surfaces of the translucent substrate, in which a plurality of unit prisms or unit lenses is formed.

Figure 18:
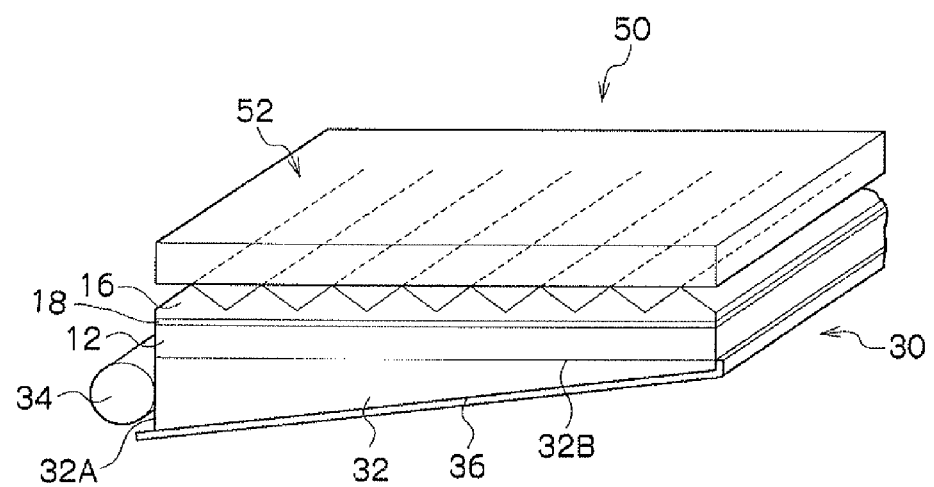
FIG. 18 is a schematic perspective view illustrating an example of a liquid crystal display device as a display device according to this invention.
Figure 19:
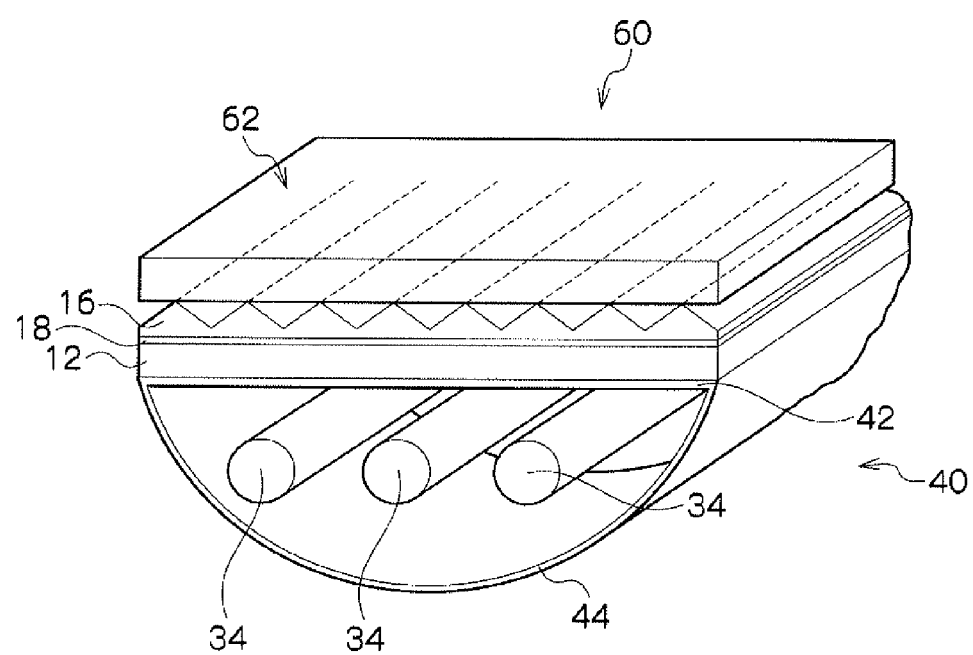
FIG. 19 is a schematic perspective view illustrating another example of the liquid crystal display device as the display device according to this invention.

[Display Device] FIGS. 18 and 19 are schematically perspective views illustrating an example of a liquid crystal display device as the display device of this invention. A liquid crystal display device 50 shown in FIG. 18 includes a liquid crystal panel 52, which is a flat surface translucent display body, and the edge-light type surface light source device 30 according to this invention, that is positioned at a rear surface of the liquid crystal panel 52 to irradiate the light to the liquid crystal panel 52 from the rear side. In addition, a liquid crystal display device 60 shown in FIG. 19 similarly includes a liquid crystal panel 62, which is a flat surface translucent display body, and the direct-light type surface light source device 40 according to this invention that is positioned at the rear surface of the liquid crystal panel 62 to irradiate the light to the liquid crystal panel 62 from the rear side. The liquid crystal display devices 50, 60 are transmissive liquid crystal display devices equipped with the backlight surface light source devices 30, 40 and are structured to illuminate each pixel forming the liquid crystal screen with the light exiting from the surface light source devices 30, 40 from the rear side. Surface light source devices 30', 40' shown in FIGS. 17A and 17B, respectively, may be used as the surface light source.

The liquid crystal display devices 50, 60 include the surface light source devices 30, 40 as structural members. The surface light source devices 30, 40 include the optical sheet 10 that has a substrate sheet having small image contrast value and high normal light brightness. As a result, the liquid crystal display devices 50, 60 can form excellent images because excellent brightness can be obtained, and because nonuniformity of brightness is not generated by fringes and the like.

[Embodiments]

Next, this invention is discussed in greater detail with reference to embodiments and comparative examples.

(Embodiment 1) A double layer coextrusion was performed by inserting into a coextrusion device a polyethylene terephthalate (hereinafter referred to as "PET") resin having a refractive index of 1.56 as a resin to be extruded for forming a translucent substrate, and a PET resin having a refractive index of 1.56 as a resin to be extruded for forming a light diffusion layer. The extruded resin for forming the light diffusion layer included micro particles 20 having an average particle diameter of 20 μm and formed of a polyester resin having a refractive index of 1.56 that were dispersed in the PET resin material at twenty weight parts. The sheet thus obtained was stretched by a stretching device, and the thickness after the stretching was 163 μm for the PET resin substrate, which was the translucent substrate 12, and 25 μm for the light diffusion layer 18. As such, a substrate sheet 71 equipped with the light diffusion layer 18 in which the predetermined gap parts 22 were formed, was produced. The stretching process was performed using a stretching device, and the double layer extruded sheet was biaxially stretched in the length direction and the width direction at an extension degree (8/4). An average size of the gap parts 22 formed was 160 μm in length a in the major axis direction in the plan view of a gap part 22 and 80 μm in length b in the minor axis direction in the plan view of the gap part 22.

Figure 20:
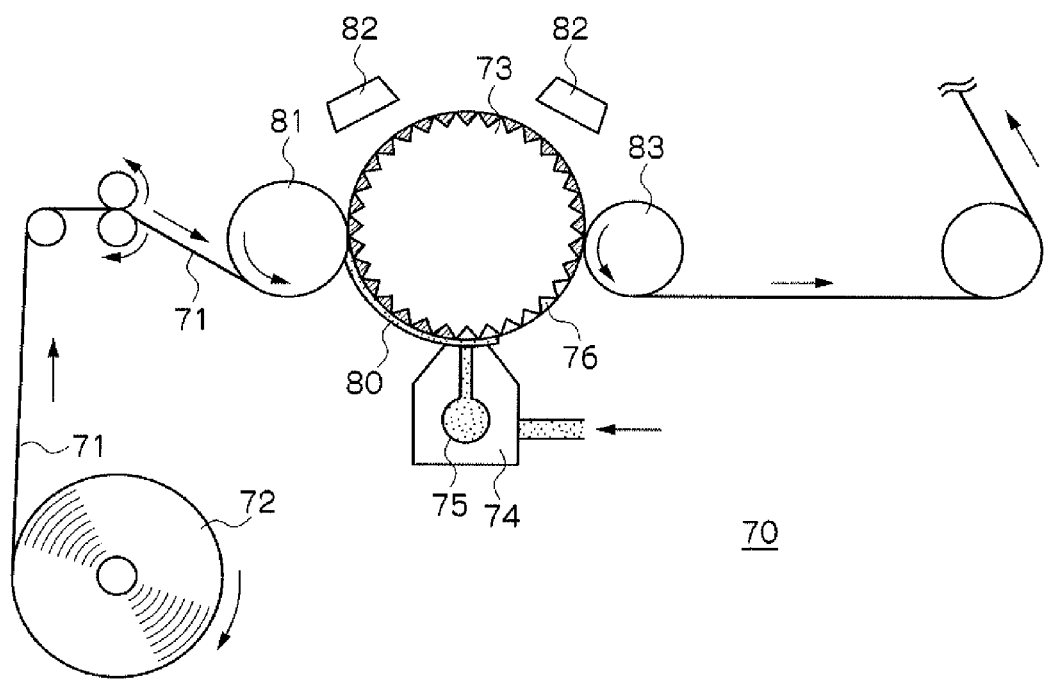
FIG. 20 is a schematic structural diagram illustrating an example of a manufacturing device for forming an optical element on a base sheet.

The substrate sheet 71 thus produced was introduced in the manufacturing device 70 as shown in FIG. 20 to form the optical element 16 (see FIG. 2) on a surface (referred to as "rear surface" in Table 1A) of a side of the substrate sheet 71 on which the light diffusion layer 18 was not formed. A winding roll 72 for winding the substrate sheet 71 obtained as discussed above was provided. A shaping roll 73, on which shaping dies for triangular unit prisms were formed on a surface of a metallic cylinder, was provided. By rotating the shaping roll about its center shaft, ultraviolet-hardening type resin liquid 80 was supplied from a T-die type nozzle 74 onto the surface of the shaping roll and was charged in the shaping dies 76 of the unit prisms. The substrate sheet 71 was then taken out from the winding roll 72 at a speed synchronous with the circumferential speed of rotation of the shaping roll. By a pressing roll 81, the substrate sheet 71 was accumulated and closely adhered on the shaping roll 73 with the resin liquid 80 therebetween. In this state, the ultraviolet light from ultraviolet light illumination devices 82, 82 was illuminated onto the substrate sheet 71 from the substrate sheet 71 side, to cross-link-harden the resin liquid 80 in the shaping dies 76 and to adhere the hardened resin liquid 80 onto the substrate sheet 71. Then, using a peeling roll 83, the running substrate sheet 71 and the optical element 16 adhering to the sheet 71 were both peeled off from the shaping roll 73, and thereby the optical sheet 10 shown in FIG. 1 in which a plurality of triangular unit prisms was arrayed, was obtained. The shape of the unit prisms was triangular, or, more specifically, in an isosceles-triangular shape with an apex angle of 85° in the cross section of the unit prisms, and was provided at a pitch of 50 μm. The unit prisms were formed in a form in which the unit prisms were arranged such that the ridge lines of the unit prisms were parallel with each other. In Embodiment 1, the optical element 16 was formed by positioning the shaping role such that the direction G of the ridge lines of the unit prisms and the major axis direction of the gap parts 22 were parallel with each other.

As shown in Table 1B as discussed below, the normal line brightness of the obtained optical sheet 10 was 96.4% of the optical sheet of Comparative Example 1 in a relative value. In addition, the Hayes value of the substrate sheet 71 was 45.9%, and the image contrast value was 3.1 when measured with 0.5 mm slits. The normal line brightness was measured using the obtained optical sheet. However, the Hayes value and the image contrast value were not measured using the obtained optical sheet, but using the substrate sheet 71 (that is, the substrate sheet 71 in which the optical diffusion layer was formed on the translucent substrate) according to this embodiment.

(Embodiment 2) The optical sheet according to Embodiment 2 was produced in a similar manner to Embodiment 1. The optical sheet of Embodiment 2 was produced to improve the normal line brightness while maintaining the image contrast value at the same level as Embodiment 1. The normal line brightness of the obtained optical sheet was 97.2% of the optical sheet of Comparative Example 1 (its brightness 100%) in a relative value. The Hayes value of the substrate sheet 71 was 36.2%, and the image contrast value was 3.2 when measured using the 0.5 mm slits. Adjustment of such characteristics was performed by adjusting the size of the gap parts 22 and the diameter and amount of micro particles 20 included in the light diffusion layer 18.

(Embodiment 3) The optical sheet according to Embodiment 3 was produced in a similar manner as Embodiment 1. The optical sheet of Embodiment 3 was produced to improve the normal line brightness while increasing the image contrast value more than Embodiment 1. The normal line brightness of the obtained optical sheet was 99.7% of the optical sheet of Comparative Example 1 in a relative value. The Hayes value of the substrate sheet 71 was 20.1%, and the image contrast value was 8.9 when measured using the 0.5 mm slits. Adjustment of such characteristics was performed by adjusting the size of the gap parts 22 and the diameter and amount of micro particles 20 included in the light diffusion layer 18.

(Embodiment 4) The optical sheet according to Embodiment 4 was produced in a similar manner to Embodiment 1. The optical sheet of Embodiment 4 was produced to include isotropic diffusion of light by shaping the gap parts 22 to be circular while maintaining the image contrast value at the same level as Embodiment 1. The normal line brightness of the obtained optical sheet was 99.7% of the optical sheet of Comparative Example 1 (its brightness 100%) in a relative value. The Hayes value of the substrate sheet 71 was 14.2%, and the image contrast value was 9.2 when measured using the 0.5 mm slits. Adjustment of the shape of the gap parts 22 and such characteristics was performed by adjusting the stretching scale in the length and width directions and by adjusting the size of the gap parts 22 and the diameter and amount of micro particles 20 included in the light diffusion layer 18. The average size of the gap parts 22 was 24 μm in the lengths that were orthogonal with each other in plan view and were substantially circular in shape.

The optical sheet of Embodiment 4 included the circular gap parts 22 and indicated the isotropic diffusion of light, similar to the later discussed Comparative Examples 1-4. As understood from results shown in Table 1A, 1B below, Embodiment 4 provided particularly excellent image contrast.

(Embodiment 5) The optical sheet according to Embodiment 5 was produced in a similar manner to Embodiment 1. The optical sheet of Embodiment 5 included unit prisms arranged on a surface of the substrate sheet 71 opposite from the surface of the substrate sheet 71 of Embodiment 1 (that is, the surface on which the light diffusion layer 18 was formed). The normal line brightness of the obtained optical sheet was 96.3% of the optical sheet of Comparative Example 1 (its brightness 100%) in a relative value.

(Embodiment 6) The optical sheet according to Embodiment 6 was produced in a similar manner as Embodiment 1. The optical sheet of Embodiment 6 included unit prisms, which arrangement direction on the substrate sheet 71 produced in Embodiment 1 was rotated by 90 degrees. To obtain such an optical sheet, a shaping roll 73 on which the direction of the pattern of the shaping die was rotated by 90 degrees was produced and used. The normal line brightness of the obtained optical sheet was 95.3% of the optical sheet of Comparative Example 1 (its brightness 100%) in a relative value.

(Embodiment 7) The optical sheet according to Embodiment 7 was produced in a similar manner to Embodiment 1. The optical sheet of Embodiment 7 was produced to include isotropic diffusion of light by shaping the gap parts 22 circular and to enlarge the gap parts 22 compared with Embodiment 4. The normal line brightness of the obtained optical sheet was 98.5% of the optical sheet of Comparative Example 1 (its brightness 100%) in a relative value. The Hayes value of the substrate sheet 71 was 23.3%, and the image contrast value was 12.8 when it was measured using the 0.5 mm slits.

(Embodiment 8) The optical sheet according to Embodiment 8 was produced in a similar manner to Embodiment 1. The optical sheet of Embodiment 8 was produced to change the shape of the gap parts 22 to an elongated shape, while maintaining the image contrast value at the same level as Embodiment 1. The normal line brightness of the obtained optical sheet was 99.2% of the optical sheet of Comparative Example 1 (its brightness 100%) in a relative value. The Hayes value of the substrate sheet 71 was 22.8%, and the image contrast value was 3.5 when measured using the 0.5 mm slits.

Comparative Example 1

A substrate sheet with a matt layer having a thickness of 8 μm was produced by coating a polyethylene terephthalate film for optics (A4300 manufactured by Toyobo Co., Ltd.) having a refractive index of 1.56 and a thickness of 188 μm with a matt ink (a polyester resin mixed with acrylic fine particles having a particle diameter of 5 μm). The substrate sheet thus produced was introduced to the manufacturing device 70 shown in FIG. 20 to produce the optical sheet of Comparative Example 1 by forming the optical element 16 on a surface of the substrate sheet opposite from the surface on which the matt layer was formed. For producing the substrate sheet, manufacturing conditions were adjusted such that the Hayes value became approximately 28%-32%. The Hayes value of the obtained substrate sheet was 29.3%, and the image contrast of the substrate sheet was 22.5 when measured using the 0.5 mm slits.

Comparative Example 2

The substrate sheet was produced by coating in a similar manner to Comparative Example 1. The substrate sheet of Comparative Example 2 was produced such that the Hayes value similar to Embodiment 1 was obtained. The Hayes value was adjusted by increasing the amount of acrylic fine particles included in the matt ink (see Table 1B). The substrate sheet thus manufactured was introduced to the manufacturing device 70 as shown in FIG. 20 similarly to Embodiment 1 to produce the optical sheet of Comparative Example 2 by forming the optical element 16 on a surface of the substrate sheet opposite from the surface on which the matt layer was formed. The Hayes value of the obtained substrate sheet was 46.2%, and the image contrast value of the substrate sheet was 17.2 when measured using the 0.5 mm slits.

Comparative Example 3

The optical sheet of Comparative Example 3 was produced in a similar manner to Comparative Example 1. In the substrate sheet of Comparative Example 3, acrylic fine particles included in the matt ink having a particle diameter of 20 μm were used, and the density of the particles in a unit area was at the same level as the density of the gap parts in Embodiment 1. The normal line brightness of the obtained optical sheet was 93.4% of the optical sheet of Comparative Example 1. The Hayes value of the substrate sheet was 12.7%, and the image contrast value of the substrate sheet was 42.1 when measured using the 0.5 mm slits.

Comparative Example 4

The optical sheet of Comparative Example 4 was produced in a similar manner to Comparative Example 1. In the substrate sheet of Comparative Example 4, acrylic fine particles included in the matt ink having a particle diameter of 80 μm were used, and the density of the particles in a unit area was at the same level as the density of the gap parts in Embodiment 1. The normal line brightness of the obtained optical sheet was 94.8% of the optical sheet of Comparative Example 1 (its brightness 100%). The Hayes value of the substrate sheet was 10.8%, and the image contrast value of the substrate sheet was 59.8 when measured using the 0.5 mm slits.

(Measurement) The light diffusion layer 18 structuring the obtained optical sheet was observed in plan view by a microgram to measure the density of the gap parts 22 in the light diffusion layer 18 in a unit area (gap parts/cm$^2$) and the size of the gap parts 22 (minor axis diameter μm/major axis diameter μm).

Using a micro deviation luminance meter (model BM-7 manufactured by Topcon Corporation), which was a device to measure brightness at each exit angle of light beam, and a light table through which the isotropic diffused light exited as the light source, the normal light brightness was measured at a view angle of one degree as the measurement condition. At this time, based on the brightness value measured in the respective optical sheet of Embodiments 1-8 and Comparative Example 1-4, the normal line brightness of the optical sheet of Embodiments 1-8 and Comparative Examples 2-4 were measured in a relative value with the normal line brightness value of the optical sheet of Comparative Example as 100%. The results are shown in Table 1A, 1B. The normal line brightness for the optical sheets of Embodiments 1-8 were all equal to or greater than 95% (in a relative value compared with Comparative Example 1). The entire light transmissivites in Table 1B were measured using a light beam transmissometer (model HM-150 manufactured by Murakami Color Research Laboratory Co., Ltd.).

The Hayes value was measured with the optical sheet without the optical element 16, that is, the substrate sheet 71, in which the light diffusion layer 18 having the gap parts 22 was formed on the translucent substrate 12, as a sample. The Hayes value was determined from a result of measurement in accordance with JIS K 7361-1 using a sampled obtained at 60 mm×60 mm from the center of the substrate sheet 71 measured by a light beam transmissometer (manufactured by Murakami Color Research Laboratory Co., Ltd.; model: HM-150). The results are shown in Table 1B.

The image contrast value was measured using a sample of the substrate sheet 71, in which the light diffusion layer 18 having the gap parts 22 was formed on the optical sheet 10 from which the optical element 16 was excluded, that is, the translucent substrate 12. For measurement, an image clarity measurement device (Model ICM-1DP manufactured by Suga Test Instruments Co., Ltd.) was used, and the image contrast value was measured, in accordance with JIS K 7374, by a transmissivity measurement, at zero measurement angle, and with optical comb (slit widths: 2.0 mm, 1.0 mm, 0.5 mm, 0.125 mm). Explaining the evaluation of the image contrast value at, for example, the slit width of 0.5 mm, the level of defocus was significant under the value 15, and thus, the generation of nonuniformity of brightness caused by interference fringes and the like can be suppressed. The level of defocus was medium in a range of the values 20-40, and the nonuniformity of brightness caused by interference fringes and the like may be visually recognizable. The level of defocus was low beyond the value 50, and the nonuniformity of brightness caused by interference fringes and the like was visually recognizable. The optical sheets of Comparative Examples 1-4 were similarly measured. The results are shown in Tables 1A, 1B.

For the diffusion of light, diffusion characteristics at the time of changing the angle of incident light from 0° to ±10° were measured using a three-dimensional gonio-system (manufactured by Optex Co., Ltd.). For the vertical angle of view (γV), diffusion characteristics of the substrate sheet 71 produced respectively in Embodiments 1 and 7 and Comparative Example 4 in the vertical direction were measured. For the horizontal angle of view (αV), diffusion characteristics of the substrate sheet 71 produced respectively in Embodiments 1 and 7 and Comparative Example 4 in the horizontal direction were also measured. The results were shown in FIGS. 21 and 22.

Figure 21:
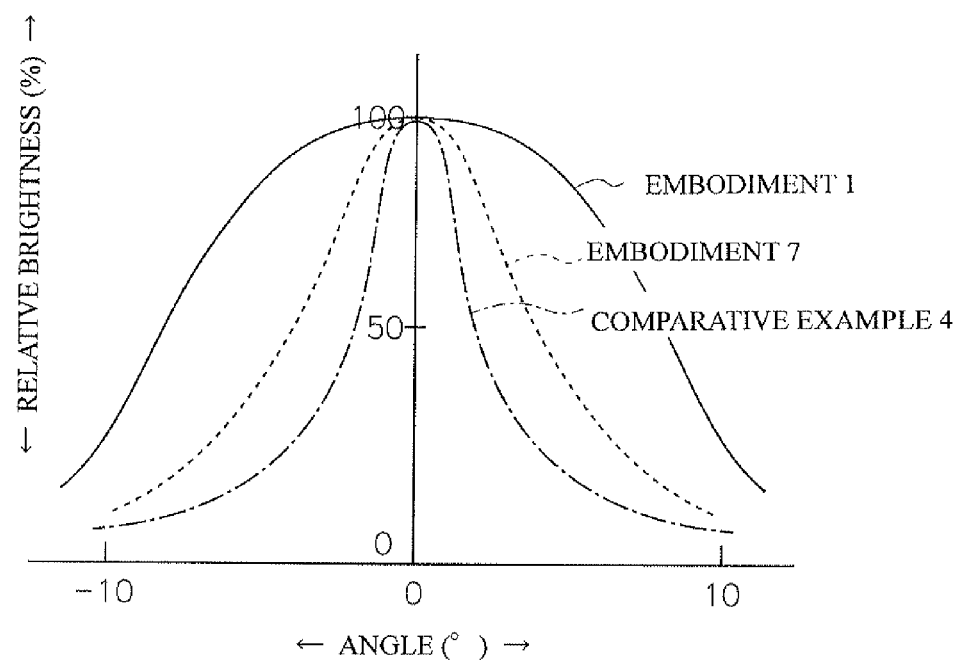
FIG. 21 shows results of measuring diffusion characteristics of the base sheet in a perpendicular direction.
Figure 22:
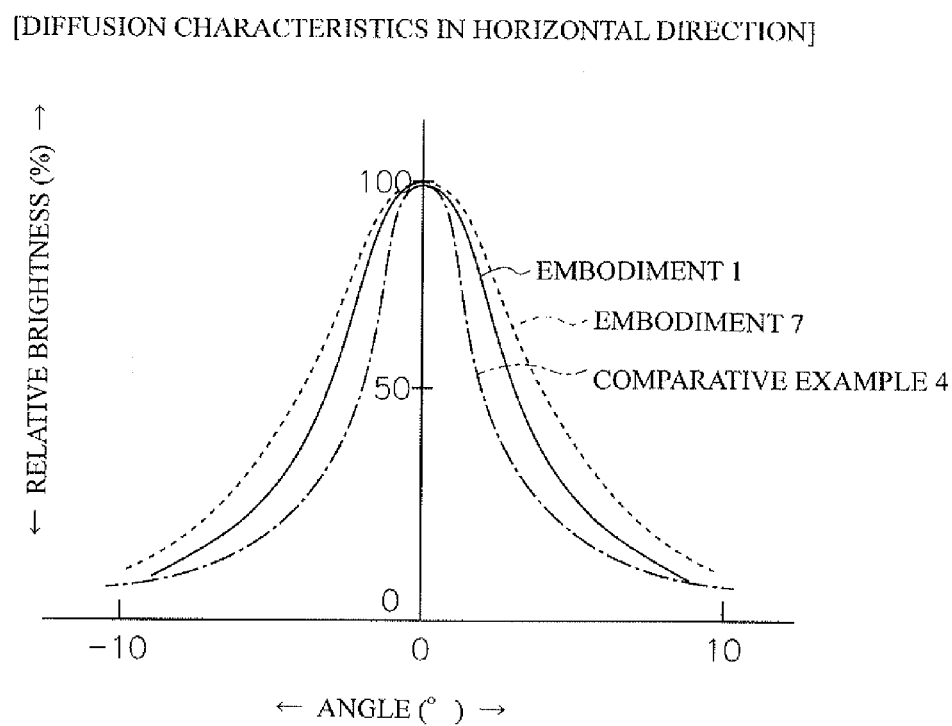
FIG. 22 shows results of measuring the diffusion characteristics of the base sheet in a horizontal direction.

FIGS. 21 and 22 show relationships between the relative brightness and angles in the vertical and horizontal directions with the front brightness being 100%, using the substrate sheet 71 produced respectively in Embodiments 1 and 7 and Comparative Example 4 as samples. The "diffusion characteristics" represents the diffusion of light in the vertical and horizontal directions by a light diffusion curve determined by the brightness and diffusion angles. The diffusion characteristics in FIG. 21 indicate the diffusion of light in the vertical direction. The "vertical direction" was a direction parallel with a major axis direction of the gap parts formed in an approximately oval shape oriented so as to extend in the uniaxial direction in the plan view of the substrate sheet 71. In contrast, the diffusion characteristics shown in FIG. 22 indicate the diffusion of light in the horizontal direction. The "horizontal direction" was a direction orthogonal to the major axis direction of the approximately oval gap part oriented so as to extend in the uniaxial direction in the plan view of the substrate sheet 71.

As understood from Table 1A, 1B, the substrate sheet used in Comparative Example 4 included fine particles having a particle diameter of 80 μm and did not include the gap parts. On the other hand, the substrate sheet 71 used in Embodiment 7 included the gap parts isotropically at 80 μm. The substrate sheet 71 used in Embodiment 1 included the gap part having a ratio of minor diameter/major diameter=80 μm/160 μm. FIGS. 21 and 22 indicate the diffusion of light in these substrate sheets. The light diffusion curve (also called as a relative brightness distribution curve) for the substrate sheet of Comparative Example 4 indicates the diffusion characteristics in a narrow range (small half bandwidth) in both the vertical direction shown in FIG. 21 and the horizontal direction shown in FIG. 22. The light diffusion curve for the substrate of Embodiment 7 indicates the diffusion characteristics in a relatively wider angle range than Comparative Example 4 in both the vertical direction shown in FIG. 21 and the horizontal direction shown in FIG. 22. In contrast, the light diffusion curve for the substrate sheet of Embodiment 1 indicates the diffusion characteristics in a wider angle range (larger half bandwidth) in the vertical direction shown in FIG. 21 but a narrower angle range than Embodiment 7 in the horizontal direction shown in FIG. 22. This is because Embodiment 7, which included anisotropic gap parts, indicates better diffusion of light than Comparative Example 4, which included as isotropic gap parts. However, because the gap parts of Embodiment 7 and the particles of Comparative Example 4 were isotropic in shape, the diffusion characteristics become substantially equivalent to the same in the vertical and horizontal directions. On the other hand, Embodiment 1, which included anisotropic gap parts, shows substantially remarkable difference in the diffusion characteristics between the vertical and horizontal directions. As discussed above, this indicates that the brightness of the optical sheet depends on relationships between the direction of orientation of the approximately oval gap parts and the diffusion characteristics.

In this application, the half bandwidth obtained from the light diffusion curve was a width of the diffusion angle at the relative brightness of 50% in FIG. 21. Therefore, for the substrate sheet of Embodiment 1, for example, the horizontal direction that was the measurement direction of the diffusion characteristics shown in FIG. 22 is the "direction in which the virtual line indicating the maximum half bandwidth the bandwidth obtained from the light diffusion curve extends" and the "direction orthogonal to the major axis direction of the approximately oval gap parts oriented in the uniaxial direction in plan view."

(Evaluation) Based on the results shown in Table 1A, 1B and the diffusion characteristics shown in FIGS. 21 and 22, the optical sheet 10 of Embodiments 1-8 according to the invention indicates that the Hayes value was in a range of 20%-95%, and that the image contrast value was equal to or less than 15 in any embodiments with the 0.5 mm slits, for example. Moreover, the normal line brightness was equal to or greater than 95% (values relative to Comparative Example 1) in any embodiment. These results show that the nonuniformity of brightness due to interference fringes and the like can be suppressed while maintaining sufficient brightness for the viewer by using the surface light source device having the optical sheet as the backlight member for a liquid crystal display device.

Table 2 shows evaluation results of the uneven brightness when viewed from outside with the optical sheet of Embodiments 1 and 6 and Comparative Example 2 provided on the direct-light type backlight unit and the edge-light type backlight, respectively.

At this time, when using the direct-light type back light unit, or when using the edge-light type backlight unit, the unit prism of the respective optical sheet and the cold-cathode tube, which was the light source of each of the backlight units, were set such that the ridge line direction of the unit prisms and the longitudinal direction of the cold-cathode tube were in parallel with each other (see FIGS. 13 and 14). In contrast, the gap parts 22 of the light diffusion layer 18 and the unit prism of each optical sheet were positioned such that the major axis direction of the approximately oval shape of the gap parts 22 and the ridge line direction of the unit prism were in parallel with each other when using the direct-light type back light unit and orthogonal to each other when using the edge-light type backlight unit.

From the results shown in Table 2, uneven brightness was clearly observed when using the optical sheet of Comparative Example 2. However, the uneven brightness was improved when using the optical sheet of Embodiments 1 and 6. In particular, it was confirmed that the use of the optical sheet of Embodiment 1 in the direct-light type backlight unit and the optical sheet of Embodiment 6 in the edge-light type backlight unit provided the most effective improvement of the uneven brightness.

TABLE 1A

|  | No. of Gap Parts [gap parts/cm²] | Diameter of gap parts: Minor diameter/Major diameter [μm] | Major axis direction of gap parts and ridge line direction of prism | Location of gap parts formed |
|---|---|---|---|---|
| Embodiment 1 | 225 | 80/160 | Parallel | Rear surface |
| Embodiment 2 | 256 | 60/140 | Parallel | Rear surface |
| Embodiment 3 | 238 | 24/80 | Parallel | Rear surface |
| Embodiment 4 | 240 | 24/24 | (Isotropic) | Rear surface |
| Embodiment 5 | 225 | 80/160 | Parallel | Prism surface |
| Embodiment 6 | 225 | 80/160 | Orthogonal | Rear surface |
| Embodiment 7 | 230 | 80/80 | (Isotropic) | Rear surface |
| Embodiment 8 | 235 | 24/160 | Parallel | Rear surface |
| Comparative Example 1 | 1931 | 5 (no gaps) | (Isotropic) | Rear surface |
| Comparative Example 2 | 2650 | 5 (no gaps) | (Isotropic) | Rear surface |
| Comparative Example 3 | 242 | 20 (no gaps) | (Isotropic) | Rear surface |
| Comparative Example 4 | 228 | 80 (no gaps) | (Isotropic) | Rear surface |

*Gap parts are not formed in any of the comparative examples due to the use of coating method.

TABLE 1B

|  | Normal line brightness [%] | Entire light transmissivity [%] | Hayes [%] | Image contrast Slit width [mm] | | | |
|---|---|---|---|---|---|---|---|
|  |  |  |  | 0.125 | 0.5 | 1.0 | 2.0 |
| Embodiment 1 | 96.4 | 81.6 | 45.9 | 2.8 | 3.1 | 7.1 | 18.6 |
| Embodiment 2 | 97.2 | 82.6 | 36.2 | 3.3 | 3.2 | 7.4 | 20.3 |
| Embodiment 3 | 99.7 | 85.9 | 20.1 | 5.5 | 8.9 | 22.5 | 51.9 |
| Embodiment 4 | 99.7 | 87.5 | 14.2 | 8.2 | 9.2 | 26.3 | 63.0 |
| Embodiment 5 | 96.3 | 81.6 | 45.9 | 2.8 | 3.1 | 7.1 | 18.6 |
| Embodiment 6 | 95.3 | 81.6 | 45.9 | 2.8 | 3.1 | 7.1 | 18.6 |
| Embodiment 7 | 98.5 | 86.9 | 23.3 | 12.4 | 12.8 | 28.5 | 68.0 |
| Embodiment 8 | 99.2 | 87.2 | 22.8 | 3.2 | 3.5 | 7.8 | 17.2 |
| Comparative Example 1 | 100 | 90.5 | 29.3 | 21.4 | 22.5 | 32.0 | 57.1 |
| Comparative Example 2 | 87.5 | 89.2 | 46.2 | 17.0 | 20.0 | 25.0 | 37.5 |
| Comparative Example 3 | 93.4 | 90.8 | 12.7 | 46.2 | 42.1 | 52.2 | 78.8 |
| Comparative Example 4 | 94.8 | 90.8 | 10.8 | 64.0 | 59.8 | 64.1 | 81.7 |

*Gap parts are not formed in any of the comparative examples due to the use of coating method.

TABLE 2

|  | Direct-light backlight | Edge-light type backlight |
|---|---|---|
| Embodiment 1 | ○ | Δ |
| Embodiment 6 | Δ | ○ |
| Comparative Example 2 | X | X |

Evaluation:
○ No visible unevenness
Δ Small recognizable unevenness
X Clearly visible unevenness

DESCRIPTION OF NOTATIONS 10, 10A, 10B, 10C . . . Optical sheet,
12 . . . Translucent substrate,
13, 71 . . . Substrate sheet,
14 . . . Unit prisms,
14A, 14B . . . Unit lenses,
16, 16B, 16C . . . Optical element,
18 . . . light diffusion layer,
19 . . . Resin material,
20 . . . Micro particle,
22 . . . Gap part,
30, 30', 40, 40' . . . Surface light source device,
32 . . . Light guide body,
32A . . . Side end surface,
32B . . . Light discharge surface,
34 . . . Light source,
36, 44 . . . Light reflection plate,
50, 60 . . . Liquid crystal display device,
52, 62 . . . Liquid crystal panel,
S1 . . . One surface of translucent substrate,
S2 . . . Another surface of translucent substrate,
X . . . Direction orthogonal to normal line of optical sheet,
Y . . . Normal line of optical sheet,
a . . . Length in major axis direction of gap parts when viewing gap part in plan view,
b . . . Length in minor axis direction of gap parts when viewing gap part in plan view,
F . . . Direction in which virtual line that indicates maximum half-bandwidth extends,
H . . . Width direction (longitudinal direction) of linear light source,
J . . . Arrangement direction of unit prisms

The invention claimed is:

1. An optical sheet, comprising:
a translucent substrate having first and second surfaces;
an optical element provided on the first surface of the translucent substrate, the optical element including a plurality of unit prisms or unit lenses arranged thereon; and
at least one light diffusion layer provided in at least one of the following locations:
between the first surface of the translucent substrate and the optical element; and
on the second surface of the translucent substrate, wherein the at least one light diffusion layer includes micro particles and gap parts which are formed around the micro particles, respectively, and each of the gap parts has an oval shape oriented in a uniaxial direction, and an image contrast value of the light diffusion layer having the gap parts is equal to or less than 15 at a slit pitch of 0.5 mm, the image contrast value being measured by a method standardized by JIS K 7374.

2. An optical sheet, comprising:
a translucent substrate in which micro particles and gap parts are formed near at least one of first and second surfaces of the translucent substrate, or within an area from the first surface to the second surface of the translucent substrate, the gap parts being formed around the micro particles, respectively, and each of the gap parts has an oval shape oriented in a uniaxial direction; and an optical element that is configured with a plurality of unit prisms or unit lenses provided on one of the first and second surfaces of the translucent substrate, wherein an image contrast value of the translucent substrate having the gap parts is equal to or less than 15 at a slit pitch of 0.5 mm, the image contrast value being measured by a method standardized by JIS K 7374.

3. The optical sheet of claim 1, wherein
the light diffusion layer having the gap parts is a uniaxially or biaxially stretched transparent resin layer in which micro particles are dispersed, and the gap parts are in a flat shape in cross sectional view that extends in a direction orthogonal to a normal line of the optical sheet.

4. The optical sheet of claim 1, wherein the gap parts are approximately oval and are oriented in the uniaxial direction in plan view.

5. The optical sheet of claim 1, wherein the gap parts are approximately circular in plan view.

6. The optical sheet of claim 1, wherein the light diffusion layer having the gap parts has anisotropic diffusion.

7. The optical sheet of claim 6, wherein, when representing diffusion of light for the anisotropic optical sheet by a light diffusion curve represented by brightness and a diffusion angle, a direction in which the virtual line indicating a maximum of half bandwidths obtained from the light diffusion curve extends, is a direction orthogonal to a major axis direction of the gap parts formed in an approximately oval shape oriented in the uniaxial direction in plan view.

8. The optical sheet of claim 6, wherein, when representing diffusion of light for the optical sheet having anisotropic diffusion by a light diffusion curve represented by brightness and a diffusion angle, a first direction in which the virtual line indicating the maximum of half bandwidths obtained from the light diffusion curve extends, and a second direction of a ridge line of the unit prisms or unit lenses structuring the optical element, are orthogonal or approximately orthogonal to each other.

9. The optical sheet of claim 6, wherein, when representing diffusion of light for the anisotropic optical sheet by a light diffusion curve represented by brightness and a diffusion angle, a first direction in which the virtual line indicating a maximum of half bandwidths obtained from the light diffusion curve extends, and a second direction of a ridge line of the unit prisms or unit lenses structuring the optical element, are parallel or approximately parallel to each other.

10. The optical sheet of claim 1, wherein the light diffusion layer having the gap parts has isotropic diffusion.

11. The optical sheet of claim 1, wherein
a Hayes value of the light diffusion layer having the gap parts is equal to or greater than 20% and equal to or less than 95%, the Hayes value measured by a method standardized by JIS K 7361-1.

12. A surface light source device, comprising:
a light guide body that includes a light incidence surface and a light discharge surface, that is formed of a translucent material, and that discharges light introduced from the light incidence surface;

a light source that illuminates light to the light incidence surface and through the light guide body; and an optical sheet that transmits the light exiting from the light discharge surface, the optical sheet including:
a translucent substrate having first and second surfaces,
an optical element provided on at least one of the first and second surfaces of the translucent substrate, the optical element including a plurality of unit prisms or unit lenses arranged thereon, and at least one light diffusion layer provided in at least one of the following locations: between the first surface of the translucent substrate and the optical element; and on the second surface of the translucent substrate, wherein the at least one light diffusion layer includes micro particles and gap parts which are formed around the micro particles, respectively and each of the gap parts has an oval shape oriented in he uniaxial direction, and wherein an image contrast value of the at least one light fusion layer having the gap parts is equal to or less than 15 at a slit pitch of 0.5 mm, the image contrast value being measured by a method standardized by JIS K 7374.

13. A surface light source device, comprising: an optical sheet that comprises: a translucent substrate having first and second surfaces, an optical element provided on at least one of the first and second surfaces of the translucent substrate, the optical element including a plurality of unit prisms or unit lenses arranged thereon, and at least one light diffusion layer provided in at least one of the following locations: between the first surface of the translucent substrate and the optical element; and on the second surface of the translucent substrate, wherein the at least one light diffusion layer includes micro particles and gap parts which are formed around the micro particles, respectively and each of the gap parts has an oval shape oriented in the uniaxial direction; a light source that illuminates light from a rear side of the optical sheet; and a reflection body positioned on a side opposite from the optical sheet of the light source and reflecting the light from the light source to the optical sheet, wherein an image contrast value of the at least one light diffusion layer having the gap parts is equal to or less than 15 at a slit pitch of 0.5 mm, the image contrast value being measured by a method standardized by JIS K 7374.

14. The surface light source device of claim 12, wherein the optical element is provided on a side of the optical sheet from which the light from the light source exits.

15. The surface light source device of claim 12, wherein the optical element is provided on a side of the optical sheet from which the light from the light source enters.

16. A surface light source device, comprising:
a light guide body that includes a light incidence surface and a light discharge surface, is formed of a translucent material, and discharges light introduced from the light incidence surface;

a light source that illuminates light to the light incidence surface and through the light guide body; and an optical sheet that transmits the light exiting from the light discharge surface, the optical sheet including:
- a translucent substrate having first and second surfaces, including gap parts formed near the first surface of the translucent substrate or from the first surface to the second surface of the translucent substrate; and
- an optical element that is provided on the first surface of the translucent substrate, the optical element including a plurality of unit prisms or unit lenses arranged thereon, and at least one light diffusion layer provided in at least one of the following locations:

between the first surface of the translucent substrate and the optical element; and on the second surface of the translucent substrate, wherein the at least one light diffusion layer includes micro particles and, gap parts which are formed around the micro particles, respectively and each of the gap parts has an oval shape oriented in the uniaxial direction, and an image contrast value of the at least one light diffusion layer having the gap parts is equal to or less than 15 at a slit pitch of 0.5 mm, the image contrast value being cured by a method standardized by JIS K 7374.

17. A display device, comprising:
a flat shaped translucent display body; and
the surface light source device of claim 12 that is positioned on a rear side of the translucent display body and that irradiates light from the rear side of the translucent display body.

18. The optical sheet of claim 1, wherein
the oval shape has a short axis and a long axis, and
the short axis has a length from 1.2 times to 4.0 times of an average particle diameter of the micro particle, and
the long axis has a length from 4.0 times to 8.0 times of the average particle diameter of the micro particle.

19. The optical sheet of claim 1, wherein
at least one of the number, shape, size and volume of the gap parts is defined so that an image contrast value of the light diffusion layer having the gap parts is equal to or less than 15 at a slit pitch of 0.5 mm, the image contrast value measured by a method standardized by JIS K 7374.

\* \* \* \* \*

UNITED STATES PATENT AND TRADEMARK OFFICE
CERTIFICATE OF CORRECTION

PATENT NO. : 8,456,590 B2
APPLICATION NO. : 12/521421
DATED : June 4, 2013
INVENTOR(S) : Hamada et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 975 days.

Signed and Sealed this

Eighth Day of September, 2015

Michelle K. Lee
*Director of the United States Patent and Trademark Office*